(12) United States Patent
Ceder et al.

(10) Patent No.: US 10,978,706 B2
(45) Date of Patent: Apr. 13, 2021

(54) CATION-DISORDERED ROCKSALT LITHIUM METAL OXIDES AND OXYFLUORIDES AND METHODS OF MAKING SAME

(71) Applicants: The Regents of the University of California, Oakland, CA (US); Massachusetts Institute Of Technology, Cambridge, MA (US)

(72) Inventors: Gerbrand Ceder, Orinda, CA (US); HuiWen Ji, Walnut Creek, CA (US); Zhengyan Lun, Albany, CA (US); William Richards, San Francisco, CA (US); Daniil Kitchaev, Goleta, CA (US)

(73) Assignees: THE REGENTS OF THE UNIVERSITY OF CALIFORNIA, Oakland, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 55 days.

(21) Appl. No.: 16/134,615

(22) Filed: Sep. 18, 2018

(65) Prior Publication Data

US 2019/0088945 A1 Mar. 21, 2019

Related U.S. Application Data

(60) Provisional application No. 62/647,326, filed on Mar. 23, 2018, provisional application No. 62/560,330, filed on Sep. 19, 2017.

(51) Int. Cl.
  *H01M 4/505* (2010.01)
  *H01M 10/0525* (2010.01)
  (Continued)

(52) U.S. Cl.
  CPC .......... *H01M 4/505* (2013.01); *C01G 45/006* (2013.01); *C01G 45/1228* (2013.01);
  (Continued)

(58) Field of Classification Search
  CPC ................. H01M 4/505; H01M 4/525; H01M 2004/028; H01M 10/052; H01M 10/0525;
  (Continued)

(56) References Cited

U.S. PATENT DOCUMENTS 4,049,891 A 9/1977 Hong et al.
4,302,518 A 11/1981 Goodenough et al.
(Continued)

FOREIGN PATENT DOCUMENTS

CN 101997109 3/2011
EP 1 189 296 3/2002
(Continued)

OTHER PUBLICATIONS

International Search Report dated Nov. 21, 2018 in International Patent Application No. PCT/US2018/051527 (6 pages).
(Continued)

*Primary Examiner* — Brittany L Raymond
(74) *Attorney, Agent, or Firm* — Smith, Gambrell & Russell, LLP

(57) ABSTRACT

A disordered rocksalt lithium metal oxide and oxyfluoride as in manganese-vanadium oxides and oxyfluorides well suited for use in high capacity lithium-ion battery electrodes such as those found in lithium-ion rechargeable batteries. A lithium metal oxide or oxyfluoride example is one having a general formula: $Li_xM'_aM''_bO_{2-y}F_y$, with the lithium metal oxide or oxyfluoride having a cation-disordered rocksalt structure of one of (a) or (b), with (a) $1.09 \leq x \leq 1.35$, $0.1 \leq a \leq 0.7$, $0.1 \leq b \leq 0.7$, and $0 \leq y \leq 0.7$; M' is a low valent transition metal and M" is a high-valent transition metal; and
(Continued)

(b) 1.1≤x≤1.33, 0.1≤a≤0.41, 0.39≤b≤0.67, and 0≤y≤0.3; M' is Mn; and M" is V or Mo. The oxides or oxyfluorides balance accessible Li capacity and transition metal capacity. An immediate application example is for high energy density Li-cathode battery materials, where the cathode energy is a key limiting factor to overall performance. The second structure (b) is optimized for maximal accessible Li capacity.

26 Claims, 15 Drawing Sheets

(51) Int. Cl.
H01M 4/525 (2010.01)
H01M 10/052 (2010.01)
C01G 45/00 (2006.01)
C01G 39/00 (2006.01)
C01G 51/00 (2006.01)
C01G 53/00 (2006.01)
C01G 49/00 (2006.01)
C01G 45/12 (2006.01)
H01M 4/02 (2006.01)

(52) U.S. Cl.
CPC ....... C01G 49/009 (2013.01); C01G 49/0072 (2013.01); C01G 51/006 (2013.01); C01G 51/50 (2013.01); C01G 53/006 (2013.01); C01G 53/50 (2013.01); H01M 4/525 (2013.01); H01M 10/0525 (2013.01); C01P 2002/72 (2013.01); C01P 2002/77 (2013.01); C01P 2004/62 (2013.01); H01M 10/052 (2013.01); H01M 2004/028 (2013.01)

(58) Field of Classification Search
CPC .............. C01G 45/006; C01G 45/1228; C01G 49/0072; C01G 49/009; C01G 51/006; C01G 51/50; C01G 53/006; C01G 53/50; C01P 2002/72; C01P 2002/77; C01P 2004/62
See application file for complete search history.

(56) References Cited

U.S. PATENT DOCUMENTS

| | | | |
|---|---|---|---|
| 4,357,215 A | 11/1982 | Goodenouah et al. | |
| 4,507,371 A | 3/1985 | Thackeray et al. | |
| 5,910,382 A | 6/1999 | Goodenough et al. | |
| 6,391,493 B1 | 5/2002 | Goodenouah et al. | |
| 6,458,487 B1 | 10/2002 | Takeuchi et al. | |
| 6,514,640 B1 | 2/2003 | Armand et al. | |
| 7,622,224 B2 | 11/2009 | Si Larbi Jouanneau et al. | |
| 8,399,130 B2 | 3/2013 | Ceder et al. | |
| 2003/0206852 A1 | 11/2003 | Yang et al. | |
| 2004/0091779 A1 | 5/2004 | Kang et al. | |
| 2005/0025699 A1* | 2/2005 | Reed | C01G 33/00 423/594.17 |
| 2005/0136331 A1 | 6/2005 | Jouanneau-Si Larbi et al. | |
| 2006/0099508 A1 | 5/2006 | Thackeray et al. | |
| 2009/0220860 A1 | 9/2009 | Xi | |
| 2010/0143799 A1 | 6/2010 | Park | |
| 2010/0143803 A1 | 6/2010 | Park | |
| 2010/0264381 A1 | 10/2010 | Ceder et al. | |
| 2011/0042609 A1 | 2/2011 | Park | |
| 2011/0076556 A1 | 3/2011 | Karthikeyan et al. | |
| 2011/0111298 A1 | 5/2011 | Lopez et al. | |
| 2011/0240913 A1 | 10/2011 | Kim et al. | |
| 2011/0294020 A1 | 12/2011 | Kim et al. | |
| 2012/0028134 A1 | 2/2012 | Kim et al. | |
| 2012/0045694 A1 | 2/2012 | Park | |
| 2013/0029224 A1 | 1/2013 | Fusalba | |
| 2013/0273425 A1 | 10/2013 | Ceder et al. | |
| 2014/0099549 A1* | 4/2014 | Ceder | H01M 4/485 429/220 |
| 2014/0141329 A1 | 5/2014 | Ceder et al. | |
| 2014/0246619 A1 | 9/2014 | Hautier et al. | |
| 2015/0044578 A1 | 2/2015 | Kourtakis | |
| 2015/0214547 A1* | 7/2015 | Jordy | H01M 4/36 252/507 |
| 2015/0340685 A1 | 11/2015 | Theuerkauf | |
| 2018/0034042 A1* | 2/2018 | Carroll | H01M 4/485 |

FOREIGN PATENT DOCUMENTS

| | | |
|---|---|---|
| EP | 2 921 455 A1 | 9/2015 |
| EP | 3 136 478 A1 | 3/2017 |
| JP | 2009-059656 | 3/2009 |
| JP | 2013-187032 | 9/2013 |
| WO | 2014/055665 | 4/2014 |

OTHER PUBLICATIONS

Written Opinion of the International Searching Authority dated Nov. 21, 2018 in in International Patent Application No. PCT/US2018/051527 (8 pages).
Wang, R., et al. A disordered rock-salt Li-excess cathode material with high capacity and substantial oxygen redox activity: $Li_{1.25}Nb_{0.25}Mn_{0.5}O_2$. Electrochemistry Communications. 2015. vol. 60. pp. 70-73.
Lee, J., et al. A new class of high capacity cation-disordered oxides for rechargeable lithium batteries: Li—Ni—Ti—Mo oxides. Energy & Environmental Science. 2015. vol. 8. No. 11. Pages 3255-3265.
Glazier, S. et al. Characterization of Disordered $Li_{(1+x)}Ti_2xFe_{(1-3x)}O_2$ as Positive Electrode Materials in Li-Ion Batteries Using Percolation Theory. Chemistry of Materials. 2015. vol. 27. pp. 7751-7756.
Kitchaev, D. et al. Design principles for high transition metal capacity in disordered rocksalt Li-ion cathodes. Energy & Environmental Science. 2018. vol. 11. pp. 2159-2171.
Yabuuchi, N., et al. Origin of stabilization and destabilization in solid-state redox reaction of oxide ions for lithium-ion batteries. Nature Communications. 2016. pp. 1-10.
Kang, B. et al. Battery materials for ultrafast charging and discharging. Nature. 2009. vol. 458. pp. 190-193.
Barpanda, P. et al. A 3.90 V iron-based fluorosulphate material for lithium-ion batteries crystallizing in the triplite structure. Nature Materials. 2011. vol. 10. pp. 772-779.
Kang, K. et al. Electrodes with High Power Capacity for Rechargeable Lithium Batteries. Science. 2006. vol. 311. pp. 977-980.
Lee, J. et al. Unlocking the Potential of Cation-Disordered Oxides for Rechargeable Lithium Batteries. Science. 2014. vol. 343. pp. 519-522.
Urban, A. et al. The Configurational Space of Rocksalt-Type Oxides for High-Capacity Lithium Battery Electrodes. Advanced Energy Materials. 2014. vol. 4. No. 1400478. p. 1-9.
Yabuuchi, N. et al. High-capacity electrode materials for rechargeable lithium batteries: $Li_2NbO_4$-based system with cation-disordered rocksalt structure. Proceedings of the National Academy of Science. 2015. vol. 112. pp. 7650-7655.
Armstrong, A. et al. Demonstrating Oxygen Loss and Associated Structural Reorganization in the Lithium Battery Cathode $Li[Ni_{0.2}Li_{0.2}Mn_{0.6}]O_2$. Journal of American Chemistry Society. 2006. vol. 128. pp. 8694-8698.
Hong, J. et al. Critical Role of Oxygen Evolved from Layered Li-Excess Metal Oxides in Lithium Rechargeable Batteries. Chemistry of Materials. 2012. vol. 24. pp. 2692-2697.
Hy, S. Direct In situ Observation of $Li_2O$ Evolution on Li-Rich High-Capacity Cathode Material, $Li[Ni_xLi_{(1-2x)/3}Mn_{(2-x)/3}]O_2$ ($0 \leq x \leq 0.5$). Journal of the American Chemistry Society. 2014. vol. 136. pp. 999-1007.

(56) References Cited

OTHER PUBLICATIONS

Hoshino, S. et al. Reversible Three-Electron Redox Reaction of $Mo^{3+}/Mo^{6+}$ for Rechargeable Lithium Batteries. ACS Energy Letters. 2017. vol. 2. pp. 733-738.

* cited by examiner

CATION-DISORDERED ROCKSALT LITHIUM METAL OXIDES AND OXYFLUORIDES AND METHODS OF MAKING SAME

FIELD OF THE INVENTION

The present invention relates to cation-disordered lithium metal oxides and oxyfluorides, and includes, disordered rocksalt vanadium and molybdenum-based lithium metal oxides and oxyfluorides, for high capacity lithium-ion battery electrodes and methods of making same. In addition, the present invention relates to disordered rocksalt lithium manganese-vanadium oxide and oxyfluoride compounds optimized to provide high capacity and energy density for use in Li-ion batteries and related applications, and a method of making the same.

BACKGROUND OF THE INVENTION

Lithium-ion ("Li-ion") batteries are one of the most investigated energy storage devices due to their relatively high energy and high power performances. The increasing demand for cheap, portable, high density energy storage for personal devices, transportation, and in the electrical grid has driven the development of advanced Li-ion battery systems. See B. Kang, G. Ceder, Nature 458, 190-193 (2009); P. Barpanda, et al. Nature materials 10, 772-779 (2011) and K. Kang, Y. S. Meng, J. Breger, C. P. Grey, G. Ceder, Science 311, 977-980 (2006).

With this increasing demand for high-performance Li-ion batteries, cathode materials, with high energy density, have been sought from diverse chemical spaces. In particular, oxide materials have drawn the most attention because they tend to deliver the highest energy density among all cathode materials.

More specifically, layered lithium transition metal oxides, such as $LiCoO_2$, have been one of the most important classes of cathode materials for rechargeable lithium batteries. Currently, state-of-the-art high energy density battery systems are based on layered oxides targeting high voltage redox activity on Co, Mn, and Ni. In these materials, lithium and transition metal ions are well-segregated to form distinct layers which alternate in their crystal structure. In these ordered compounds, Li sites and pathways (a 2D slab in the layered oxides) are separated from the transition metal sublattice, which provides stability and electron storage capacity. FIG. 1 provides a schematic diagram of the layered-rocksalt structure, Li-M-O. Having well-ordered structures where there is little or no intermixing between the Li and the transition metal sublattice is generally considered important for obtaining high-capacity cathode materials with good cycle life. Indeed, the well-layeredness in their structure has been considered necessary for high lithium mobility in the materials, and cation mixing has been observed to result in poor cyclability by slowing down lithium diffusion. These observations may have led researchers to disregard cation-disordered lithium transition metal oxides as promising cathode materials.

Recently, important understandings have been made in the oxide space that enlarges the search space of high energy density cathode materials. Specifically, cation-disordered lithium transition metal oxides ("Li-TM oxides"), which were generally considered electrochemically inactive due to limited Li diffusion by their disordered structure, can be promising cathode materials if provided with enough Li excess (i.e., where the number of Li sites is greater than that of TM sites (x>0.09 in $Li_{1+x}TM_{1-x}O_2$)). Indeed, facile Li diffusion is possible in disordered structures once enough excess Li is introduced, which, in turn, introduces a percolating network of facile Li diffusion channels (0-TM channels) through which Li diffusion can be facile in the disordered structure due to weak electrostatic repulsion on the activated Li+ ion upon Li diffusion by the lack of repulsive TM ions.

However, cation disorder/cation mixing still presents numerous difficulties and challenges in providing high energy density cathode materials. For instance, oxygen oxidation, which is often necessary to achieve high capacity from disordered materials, can trigger oxygen loss via lattice densification, which degrades 0-TM percolation (and hence Li diffusion) in the disordered materials by reducing the Li-excess level, especially near the surface. Thus, nearly all cation-disordered Li-TM oxides whose TM redox (for example, $Fe^{2+/4+}$, $Ni^{2+/4+}$, $Co^{2+/4+}$) overlaps with oxygen redox suffer from large polarization after oxygen loss, showing limited cyclability. Additionally, oxygen loss can also lead to resistive surface layers, such as the layer of $Li_2CO_3$, which can further add impedance to the cathode. Furthermore, the performance of early disordered cathode materials has been limited by the necessary presence of heavy, inactive metals in the system and by the low voltage of the active redox couples.

One previously reported strategy for improving the stability of layered (rocksalt) materials is described in U.S. Pat. No. 7,205,072 to Kang et al. Kang describes a fluorine substitution strategy on layered lithium nickel-manganese-cobalt based oxide materials that is said to improve the structural stability of the layered (rocksalt) materials against disorder. The structure selection between layered rocksalt and cation-disordered rocksalt structures depends highly on the composition of materials. The fluorine substituted lithium nickel-manganese-cobalt oxides that are discussed in Kang exclusively form into a layered rocksalt structure based on the compositional make-up and the oxidation states of the elements included in the composition. Kang, for example, does not discuss the role of fluorine substitution or the use of a divalent transition metal with vanadium or molybdenum on the structural integrity of cation-disordered structures.

Thus, in a departure from the approach of utilizing layered lithium transition metal oxides, disordered rocksalt systems have been identified as potential high-capacity cathodes, as disordered rocksalt systems offer flexibility in composition and redox behavior if at least 55% of the cation sublattice is occupied by Li (e.g., see J. Lee, A. Urban, X. Li, D. Su, G. Hautier, G. Ceder, Science 343, 519-522 (2014); and A. Urban, J. Lee, G. Ceder, Advanced Energy Materials 4, 1400478 (2014)). Nonetheless, the performance of disordered cathodes has been limited by the presence of heavy inactive metals in the system, low voltage of the active redox couples, poor reversibility due to oxygen loss and electrochemical inaccessibility of some of the Li on charge (e.g., see J. Lee, D.-H. Seo, M. Balasubramanian, N. Twu, X. Li, G. Ceder, Energy Environ. Sci. 8, 3255 (2014); and N. Yabuuchi et al. Proc. Natl Acad. Sci. 112, 7650-7655 (2015)).

Accordingly, there remains a need for cation-disordered lithium transition metal oxides having improved electrochemical performances for use as, for instance, cathode materials.

SUMMARY OF THE INVENTION

Under aspects of the present invention, there is featured a lithium metal oxide or oxyfluoride having a general formula:

$Li_xM'_aM''_bO_{2-y}F_y$; inclusive of a lithium metal oxide or oxyfluoride having a cation-disordered rocksalt structure, wherein $1.09 \le x \le 1.35$, $0.1 \le a \le 0.7$, $0.1 \le b \le 0.7$, and $0 \le y \le 0.7$; M' is a low-valent transition metal; and M'' is a high-valent transition metal. One aspect of the invention features M' selected from the group consisting of $Mn^{2+}$, $Fe^{2+}$, $Co^{2+}$, $Ni^{2+}$, and combinations thereof. For instance, M' may be $Mn^{2+}$. Also, M'' is selected from the group consisting of $V^{3+}$, $V^{4+}$, $Mo^{4+}$, $Mo^{5+}$, and combinations thereof. For example, M'' may be $V^{4+}$ or $Mo^{5+}$. In still another embodiment, the lithium metal oxide or oxyfluoride has a formula: $Li_xM'_aV_bO_{2-y}F_y$, wherein $1.09 \le x \le 1.35$, $0.1 \le a \le 0.7$, $0.1 \le b \le 0.7$, and $0 \le y \le 0.7$, or a formula: $Li_xM'_aMo_bO_{2-y}F_y$, wherein $1.09 \le x \le 1.35$, $0.1 \le a \le 0.7$, $0.1 \le b \le 0.7$, and $0 \le y \le 0.7$. In yet another embodiment, the general formula: $Li_xM'_aM''_bO_{2-y}F_y$ features $1.1 \le x \le 1.2$, $0.25 \le a \le 0.4$, $0.4 \le b \le 0.6$, and $0 \le y \le 0.3$.

The lithium metal oxides or oxyfluorides under the present invention may have a cation-disordered rocksalt structure characterized by a crystallographic space group Fm-3m. Embodiments of the invention also feature lithium metal oxides or oxyfluorides having a discharge capacity of about 250 mAh/g to about 400 mAh/g and an energy density of about 700 Wh/kg to about 900 Wh/kg.

The present invention is also inclusive of a process for manufacturing cation-disordered lithium metal oxides and oxyfluorides having a general formula: $Li_xM'_aM''_bO_{2-y}F_y$, said lithium metal oxide or oxyfluoride having a cation-disordered rocksalt structure, wherein $1.09 \le x \le 1.35$, $0.1 \le a \le 0.7$, $0.1 \le b \le 0.7$, and $0 \le y \le 0.7$; M' is a low-valent transition metal; and M'' is a high-valent transition metal, including the steps of: providing at least one lithium-based precursor; providing at least one low-valent transition metal-based precursor; providing at least one high-valent transition metal-based precursor; optionally providing at least one fluorine-based precursor; mixing the at least one lithium-based precursor, the at least one low-valent transition metal-based precursor, the at least one high-valent transition metal-based precursor, and optionally the at least one fluorine-based precursor to form a mixture; and milling the mixture.

In this aspect, M' is selected from the group consisting of $Mn^{2+}$, $Fe^{2+}$, $Co^{2+}$, $Ni^{2+}$, and combinations thereof and M'' is selected from the group consisting of $V^{3+}$, $V^{4+}$, $Mo^{4+}$, $Mo^{5+}$, and combinations thereof. Further, embodiments of the process for manufacturing cation-disordered lithium metal oxides and oxyfluorides include mixing stoichiometric amounts of the at least one lithium-based precursor, the at least one low-valent transition metal-based precursor, the at least one high-valent transition metal-based precursor, and the at least one optional fluorine-based precursor, such as those represented in this paragraph. Embodiments of the present invention are further inclusive of the step of milling (e.g., milling a mixture such as described above) as by way of high energy ball milling. In yet another embodiment, at least one low-valent transition metal-based precursor that is mixed comprises MnO, CoO, FeO, NiO, or combinations thereof, and the at least one high-valent transition metal-based precursor that is mixed comprises $VO_2$, $MoO_2$, $MoO_3$, or combinations thereof. Embodiments of the present invention are also inclusive of the step of milling being carried out for about 40 hours to about 80 hours.

The present invention is further directed to a positive electrode material, including a lithium metal oxide or oxyfluoride according to the present invention. The present invention also relates to a lithium-ion battery, including a negative electrode material; an electrolyte; and a positive electrode material including a lithium metal oxide or oxyfluoride according to the present invention. The lithium-ion battery of the present invention may be used in a portable electronic device, an automobile, or an energy storage system.

A further aspect of the present invention features a lithium metal oxide or oxyfluoride having a cation-disordered rocksalt structure with the general formula: $Li_xM'_aM''_bO_{2-y}F_y$, where $1.10 \le x \le 1.33$, $0.1 \le a \le 0.41$, $0.39 \le b \le 0.67$, and $0 \le y \le 0.3$ and where M' is low valent $Mn^{2+}$ and M'' is a redox-active high-valent $V^{3+}$ or $V^{4+}$ or $Mo^{4+}$ or $Mo^{5+}$, where the fraction of M' and M'' balances accessible Li capacity with transition metal capacity within a target voltage window. The accessible Li capacity is deemed to be defined as the total Li capacity less the Li made electrochemically inaccessible by the formation of stable tetrahedral Li and Li strongly bound to F (when present). The transition metal capacity is defined as the theoretical transition metal electron capacity assuming a maximal average oxidation state of $Mn^{4+}$ for Mn, $V^{5+}$ for V and $Mo^{6+}$ for Mo. The transition metal fluoride balance results in improved Li-ion battery cathodes. In particular the lithium content in the cathode exceeds the transition metal capacity by up to and including 30% to counteract the lithium made inaccessible by F—Li binding (when F present) and tetrahedral Li formation. The resulting compounds, made in a disordered rocksalt structure, achieve a large reversible energy density over charge/discharge cycles.

Compounds LR-LMVO ($Li_{1.2}Mn_{0.2}V_{0.6}O_2$) and LR-LMVF20 ($Li_{1.23}Mn_{0.255}V_{0.515}O_{1.8}F_{0.2}$) represent embodiments under the present invention that are based on a design resulting from an empirical study directed at achieving a desired balance with a recognition that mechanisms that limited accessible Li capacity involved Li capacity exactly matching the transition metal capacity. In other words, under this aspect of the present invention there was carried out a study that involved the computational identification of the mechanisms that limited accessible Li capacity in previously disclosed families of Li—Mn—V oxides and Li—Mn—V oxyfluorides, which by design, has a Li capacity exactly matching the transition metal capacity. The aim of the empirical study was to identify the origin of the limited capacity and to design material that circumvented the limitations. The aforementioned compounds, LR-LMVO and LR-LMVF20, are illustrative of some embodiments derived from that empirical study that show beneficial attributes as described in greater detail below.

In summary, aspects of the invention include a lithium metal oxide or oxyfluoride having a general formula: $Li_xM'_aM''_bO_{2-y}F_y$, said lithium metal oxide or oxyfluoride having a cation-disordered rocksalt structure of one of (a) or (b), wherein (a) $1.09 \le x \le 1.35$, $0.1 \le a \le 0.7$, $0.1 \le b \le 0.7$, and $0 \le y \le 0.7$; M' is a low-valent transition metal and M'' is a high-valent transition metal; and (b) $1.1 \le x \le 1.33$, $0.1 \le a \le 0.41$, $0.39 \le b \le 0.67$, and $0 \le y \le 0.3$; M' is Mn; and M'' is V or Mo.

The invention is also inclusive, relative to formula (a) above, having M' selected from the group consisting of $Mn^{2+}$, $Fe^{2+}$, $Co^{2+}$, $Ni^{2+}$, and combinations thereof, such as where M' is $Mn^{2+}$.

The invention is also inclusive, relative to formula (a) above, having M'' selected from the group consisting of $V^{3+}$, $V^{4+}$, $Mo^{4+}$, $Mo^{5+}$, and combinations thereof, such as where M'' is $V^{4+}$ or $Mo^{5+}$. A further example falling under formula (a) above, features a formula: $Li_xM'_aV_bO_{2-y}F_y$, wherein $1.09 \le x \le 1.35$, $0.1 \le a \le 0.7$, $0.1 \le b \le 0.7$, and $0 \le y \le 0.7$; or wherein $1.1 \le x \le 1.2$, $0.25 \le a \le 0.4$, $0.4 \le b \le 0.6$, and $0 \le y \le 0.3$.

Embodiments of the invention also feature a cation-disordered rocksalt structure characterized by a crystallographic space group Fm-3m; and lithium metal oxide or oxyfluoride having a discharge capacity of about 250 mAh/g to about 400 mAh/g and an energy density of about 700 Wh/kg to about 900 Wh/kg.

Under another embodiment of the invention a lithium metal oxide or oxyfluoride has formula (b) and M' is Mn; and M" is V or Mo. As an example under formula (b), a lithium metal oxide of $Li_{1.2}Mn_{0.2}V_{0.6}O_2$ (LR-LMVO); or as an example of an oxyfluoride embodiment, the lithium metal oxyfluoride is $Li_{1.23}Mn_{0.255}V_{0.515}O_{1.8}F_{0.2}$ (LR-LMVF20).

The present invention also features a process for manufacturing a lithium metal oxide or oxyfluoride having a general formula: $Li_xM'_aM''_bO_{2-y}F_y$, said lithium metal oxide or oxyfluoride having a cation-disordered rocksalt structure of one of (a) or (b), wherein
  (a) $1.09 \le x \le 1.35$, $0.1 \le a \le 0.7$, $0.1 \le b \le 0.7$ and $0 \le y \le 0.7$; M' is a low valent transition metal and M" is a high valent transition metal; and
  (b) $1.1 \le x \le 1.33$, $0.1 \le a \le 0.41$, $0.39 \le b \le 0.67$, and $0 \le y \le 0.3$; M' is Mn; and M" is V or Mo. The method comprises the steps of:
   providing at least one lithium-based precursor;
   providing at least one low-valent transition metal-based precursor;
   providing at least one high-valent transition metal-based precursor;
   optionally providing at least one fluorine-based precursor;
    mixing the at least one lithium-based precursor, the at least one low-valent transition metal-based precursor, the at least one high-valent transition metal-based precursor, and optionally the at least one fluorine-based precursor to form a mixture; with final mixing optionally achieved by way of milling the mixture (e.g., high speed ball milling).

Under an embodiment of the process of the present invention, wherein the rocksalt structure is (a), M' is selected from the group consisting of $Mn^{2+}$, $Fe^{2+}$, $Co^{2+}$, $Ni^{2+}$, and combinations thereof. Under an embodiment of the process of the present invention, M" is selected from the group consisting of $V^{3+}$, $V^{4+}$, $Mo^{4+}$, $Mo^{5+}$, and combinations thereof relative to formula (a) (inclusive of when the M' group is as specified in the present paragraph).

The process of the present invention is also inclusive of mixing stoichiometric amounts of the at least one lithium-based precursor, at least one low-valent transition metal-based precursor, at least one high-valent transition metal-based precursor, and at least one optional fluorine-based precursor, where the lithium-based precursor may be added in up to 10% excess to the desired Li stoichiometry, and also milling the mixture as in a milling involving high energy ball milling.

An embodiment of the process of the present invention, wherein the rocksalt structure is (a), includes mixing together the at least one low-valent transition metal-based precursor, which comprises in this embodiment MnO, CoO, FeO, NiO, or combinations thereof, and the at least one high-valent transition metal-based precursor, which comprises in this embodiment $VO_2$, $MoO_2$, $MoO_3$, or combinations thereof.

Under embodiments of the process of the present invention the aforementioned step of milling is carried out for about 40 hours to about 80 hours.

Under embodiments of the process of the present invention, wherein the rocksalt structure is (b), M' is Mn; and M" is V or Mo. For example, under structure (b), there is produced a lithium metal oxide that is $Li_{1.2}Mn_{0.2}V_{0.6}O_2$ (LR-LMVO); or a lithium metal oxyfluoride that is $Li_{1.23}Mn_{0.255}V_{0.515}O_{1.8}F_{0.2}$ (LR-LMVF20).

An aspect of the present invention is also inclusive of a positive electrode material, comprising a lithium metal oxide or oxyfluoride having any one of the aforementioned compositions.

A further aspect of the present invention is inclusive of a lithium-ion battery, comprising:
  a negative electrode material;
  an electrolyte; and
  the aforementioned positive electrode material.

A still further aspect of the present invention is a portable electronic device, an automobile, or an energy storage system, comprising:
  the aforementioned lithium-ion battery.

The product of the present invention can be synthesized using solid state techniques where the lithium-based, transition metal precursors are mixed and milled. The fluorine-based precursor is an optional ingredient, introduced prior to mixing. The product is, for example, employed in the manufacture of the positive electrode, which is used in the construction of, for instance, lithium-ion batteries, commonly used in electronic devices, energy storage or automobiles.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
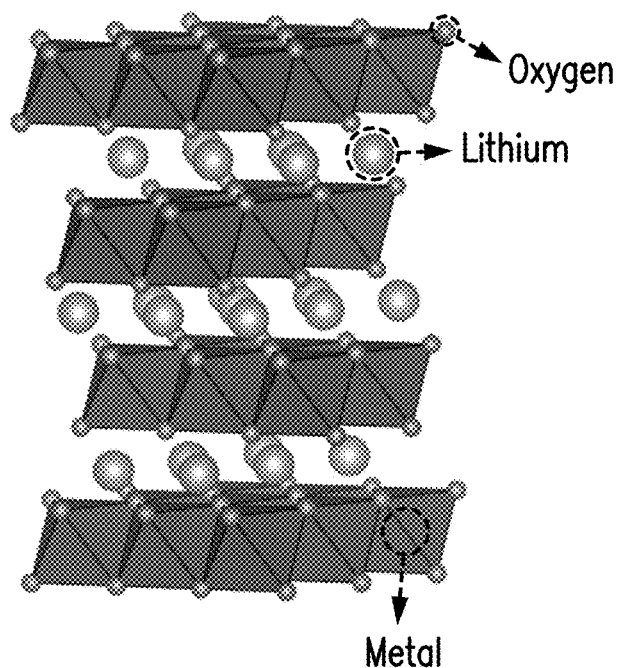
FIG. 1 is a schematic diagram of a layered-rocksalt structure.

The present invention is directed to cation-disordered lithium metal oxides. Under one aspect of the present invention there is featured cation-disordered rocksalt vanadium and molybdenum-based lithium metal oxides and oxyfluorides. Without being bound to any particular theory, it is believed that, by using a mixture of a low-valent transition metal capable of two-electron redox, for example, $Mn^{2+}$, $Fe^{2+}$, $Co^{2+}$, and $Ni^{2+}$, and a high-valent transition metal capable of at least one-electron redox, for example, $V^{3+}$, $V^{4+}$, $Mo^{4+}$, and $Mo^{5+}$, optionally coupled with partial fluorine substitution for oxygen on the anion lattice, it is possible to obtain high-capacity disordered rocksalt materials. In some embodiments of the present invention, the lithium metal oxides may not include fluorine substitution. The specific combination of valences utilized in the present invention allows for the avoidance of fluorine substitution in some embodiments. In other embodiments, the lithium metal oxides may be substituted with fluorine. The combination of the noted different valences coupled with fluorine substitution provides for high performance compositions. In this aspect, lithium metal oxides that are substituted with fluorine are herein referred to as oxyfluorides.

Due to reliance primarily on high voltage transition metal redox couples (e.g., $Mn^{2+/4+}$, $Fe^{2+/4+}$, $Co^{2+/4+}$, or $Ni^{2+/4+}$, and $V^{4+/5+}$ or $Mo^{5+/6+}$), the disordered rocksalt lithium metal oxides and oxyfluorides of the present invention are directed toward an elimination of redox-inactive transition metals from the system, an optimization of active transition metal redox couples to maximize voltage, and a balancing of the lithium to transition metal composition to eliminate irreversible oxygen loss. Indeed, the disordered rocksalt lithium metal oxides and oxyfluorides of the present invention are directed at maximizing the transition metal capacity in order to minimize the amount of oxygen redox used in the electrochemical cycling of the material. Accordingly, the disordered lithium metal oxide and oxyfluoride materials of the present invention offer high energy density and excellent reversibility of electrochemical behavior, which could not be achieved by previously reported disordered rocksalt materials. Indeed, previously reported disordered rocksalt materials lost a significant fraction of their energy density within the first few charge/discharge cycles.

Under this aspect of the present invention there is provided disordered rocksalt vanadium and molybdenum-based lithium metal oxides and oxyfluorides. In one embodiment, the oxides and oxyfluorides include a cation-disordered rocksalt structure. Indeed, the oxides and oxyfluorides discussed herein exclusively form into disordered rocksalt structures. As used herein, a cation-disordered rocksalt structure refers to a structure characterized by the crystallographic space group, $Fm\overline{3}m$. In the cation-disordered rocksalt structure of the present invention, lithium and transition metals may randomly occupy the vacant octahedral sites in the face centered cubic ("FCC") framework of oxygen, and fluorine may be substituted for oxygen. When present, the substituted fluorine is randomly distributed in the FCC framework along with the oxygen. In another embodiment, the cation-disordered rocksalt structure may include interweaving FCC structures: one made of anions, such as oxygen and fluorine, and the other made of randomly distributed lithium and transition metals. However, regardless of the design of the structure, the present invention contemplates disordered rocksalt structures where lithium occupies at least 55 percent of the cation sublattice. For example, the lithium may occupy from 55 percent to 100 percent of the cation sublattice.

Figure 2:
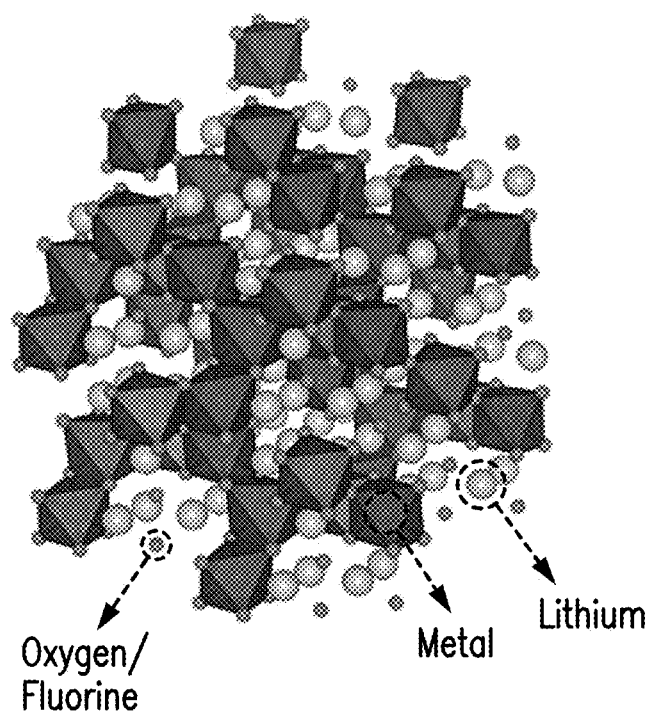
FIG. 2 is a schematic diagram of a disordered-rocksalt structure according to one embodiment of the present invention.

In some embodiments, the cation-disordered rocksalt structures of the present invention provide for the substitution of oxygen for fluorine. As discussed above, the substituted fluorine shares the FCC framework of oxygen and is randomly distributed along with oxygen. However, regardless of whether fluorine is present in the lithium metal oxide, the disordered oxides and oxyfluorides of the present invention are completely cation-mixed, i.e., cation-mixing of 100 percent. During the formation of the cation-disordered rocksalt structures, minimal non-cation mixing may occur. However, any minimal non-cation mixing that occurs is unintentional and would still be understood by one of ordinary skill in the art to mean complete cation mixing. FIG. 2 shows a cation-disordered rocksalt structure contemplated by the present invention. As can be seen in FIG. 2, the distribution of the oxygen/fluorine, lithium, and transition metal in the rocksalt structure is completely random.

The disordered rocksalt oxides and oxyfluorides of the present invention contemplate the use of a specific combination of a low-valent transition metal and a high-valent transition metal coupled with, for example, an optional partial fluorine substitution for oxygen. Under aspects of the present invention, the oxides and oxyfluorides have general formula (1):

$$Li_xM'_aM''_bO_{2-y}F_y \qquad (1)$$

where $1.09 \leq x \leq 1.35$, $0.1 \leq a \leq 0.7$, $0.1 \leq b \leq 0.7$, and $0 \leq y \leq 0.7$. As would be apparent to those of ordinary skill in the art, the general formulas of the oxides and oxyfluorides described herein refer to systems that are discharged. In another embodiment, general formula (1) may be defined as $1.10 \leq x \leq 1.30$, $0.1 \leq a \leq 0.5$, $0.2 \leq b \leq 0.6$, and $0 \leq y \leq 0.5$. In still another embodiment, general formula (1) may be defined as $1.10 \leq x \leq 1.25$, $0.2 \leq a \leq 0.4$, $0.3 \leq b \leq 0.6$, and $0 \leq y \leq 0.4$. In yet another embodiment, general formula (1) may be defined as $1.1 \leq x \leq 1.2$, $0.25 \leq a \leq 0.4$, $0.4 \leq b \leq 0.6$, and $0.1 \leq y \leq 0.3$.

According to aspects of the present invention, M' of general formula (1) is a low-valent transition metal. By the term, "low-valent transition metal," it is meant a transition metal having an oxidation state of less than +3, and more preferably, an oxidation state of +2 or less. In this aspect, the low-valent transition metal contemplated by the present invention is capable of two-electron redox. In one embodiment, M' may be Mn, Fe, Co, Ni, or any combination thereof, where each of the metals has an oxidation state of +2. For instance, M' may be Mn having an oxidation state of +2. In accordance with the present invention, M" of general formula (1) is a high-valent transition metal. By the term, "high-valent transition metal," it is meant a transition metal having an oxidation state of +3 or greater, and more preferably, an oxidation state of +4 or greater. In this aspect, the high-valent transition metal contemplated by the present invention is capable of at least one-electron redox. In one embodiment, M" may be V, Mo, or any combination thereof, where V has an oxidation state of +3 or +4 and Mo has an oxidation state of +4 or +5. In another embodiment, M" may be V having an oxidation state of +4 or Mo having an oxidation state of +5.

In another embodiment, the disordered rocksalt oxides and oxyfluorides of the present invention may be vanadium-based. That is, M" of general formula (1) may be V. For example, the oxides and oxyfluorides may have general formula (2):

$$Li_xM'_aV_bO_{2-y}F_y \qquad (2)$$

where $1.09 \leq x \leq 1.35$, $0.1 \leq a \leq 0.7$, $0.1 \leq b \leq 0.7$, and $0 \leq y \leq 0.7$. In another embodiment, general formula (2) may be defined as $1.10 \leq x \leq 1.25$, $0.1 \leq a \leq 0.5$, $0.2 \leq b \leq 0.6$, and $0 \leq y \leq 0.5$. In still another embodiment, general formula (2) may be defined as $1.10 \leq x \leq 1.25$, $0.2 \leq a \leq 0.4$, $0.3 \leq b \leq 0.6$, and $0 \leq y \leq 0.4$. In yet another embodiment, general formula (2) may be defined as $1.1 \leq x \leq 1.2$, $0.25 \leq a \leq 0.4$, $0.4 \leq b \leq 0.6$, and $0.1 \leq y \leq 0.3$. According to the present invention, M' of general formula (2) may be defined as in general formula (1). That is, M' may be a low-valent transition metal chosen from Mn, Fe, Co, Ni, or any combination thereof, where each of the metals has an oxidation state of +2.

In one embodiment, M' of general formula (2) may be Mn. For example, the disordered rocksalt materials of the present invention may include lithium manganese vanadium oxides and oxyfluorides. That is, the oxides and oxyfluorides of the present invention may have general formula (3):

$$Li_xMn_aV_bO_{2-y}F_y \qquad (3)$$

where $1.09 \leq x \leq 1.35$, $0.1 \leq a \leq 0.7$, $0.1 \leq b \leq 0.7$, and $0 \leq y \leq 0.7$. For instance, general formula (3) may be defined as $1.1 \leq x \leq 1.2$, $0.25 \leq a \leq 0.4$, $0.4 \leq b \leq 0.6$, and $0 \leq y \leq 0.3$. In one embodiment, the oxides of general formula (3) may include the compound, $Li_{1.143}Mn_{0.286}V_{0.572}O_2$, where $x=1.143$, $a=0.286$, $b=0.572$, and $y=0$. In another embodiment, the oxyfluorides of general formula (3) may include the compound, $Li_{1.156}Mn_{0.315}V_{0.528}O_{1.9}F_{0.1}$, where $x=1.156$, $a=0.315$, $b=0.528$, and $y=0.1$. In still another embodiment, the oxyfluorides of general formula (3) may include the compound, $Li_{1.171}Mn_{0.343}V_{0.486}O_{1.8}F_{0.2}$, where $x=1.171$, $a=0.343$, $b=0.486$, and $y=0.2$. In yet another embodiment, the oxyfluorides of general formula (3) may include the compound, $Li_{1.186}Mn_{0.371}V_{0.443}O_{1.7}F_{0.3}$, where $x=1.186$, $a=0.371$, $b=0.443$, and $y=0.3$.

In still another embodiment, the disordered rocksalt oxides and oxyfluorides of the present invention may be molybdenum-based. That is, M" of general formula (1) may be Mo. For example, the oxides and oxyfluorides may have general formula (4):

$$Li_xM'_aMo_bO_{2-y}F_y \qquad (4)$$

where $1.09 \leq x \leq 1.35$, $0.1 \leq a \leq 0.7$, $0.1 \leq b \leq 0.7$, and $0 \leq y \leq 0.7$. In another embodiment, general formula (4) may be defined as $1.10 \leq x \leq 1.25$, $0.1 \leq a \leq 0.5$, $0.2 \leq b \leq 0.6$, and $0 \leq y \leq 0.5$. In still another embodiment, general formula (4) may be defined as $1.10 \leq x \leq 1.25$, $0.2 \leq a \leq 0.4$, $0.3 \leq b \leq 0.6$, and $0 \leq y \leq 0.4$. In yet another embodiment, general formula (4) may be defined as $1.1 \leq x \leq 1.2$, $0.25 \leq a \leq 0.4$, $0.4 \leq b \leq 0.6$, and $0.1 \leq y \leq 0.3$. According to the present invention, M' of general formula (4) may be defined as in general formula (1). That is, M' may be a low-valent transition metal chosen from Mn, Fe, Co, Ni, or any combination thereof, where each of the metals has an oxidation state of +2.

The disordered rocksalt oxides and oxyfluorides under aspects of the present invention may have an a-lattice constant between 4.10 Å and 4.30 Å, increasing with the amount of fluorine included in the composition. In the case of LMV1, LMV2, LMV3, and LMV4, the a-lattice constant is 4.1777 Å, 4.1824 Å, 4.2001 Å and 4.2112 Å respectively. The particle size of the compounds of the present invention is between 100 and 200 nm.

The present invention also includes processes of making the disordered rocksalt oxides and oxyfluorides of the present invention. Various methods may be used for the preparation of the oxides and oxyfluorides of the present invention including, but not limited to, a solid state reaction method, an aqueous solution method, or a mechanochemical synthesis. In one embodiment, prior to the preparation method, phase diagrams showing the thermal stability of the relevant systems may be constructed to identify the composition regions where the target disordered rocksalt phase would be accessible by the desired preparation method. That is, phase diagrams showing thermal stability may be constructed to identify the composition regions where the target disordered rocksalt phase would be accessible by solid state synthesis or mechanochemical synthesis, such as high-energy ball milling. The thermal stability of a composition is a good indicator of whether the compound can be formed at a particular temperature by solid state synthesis or high-energy ball milling.

Figure 3:
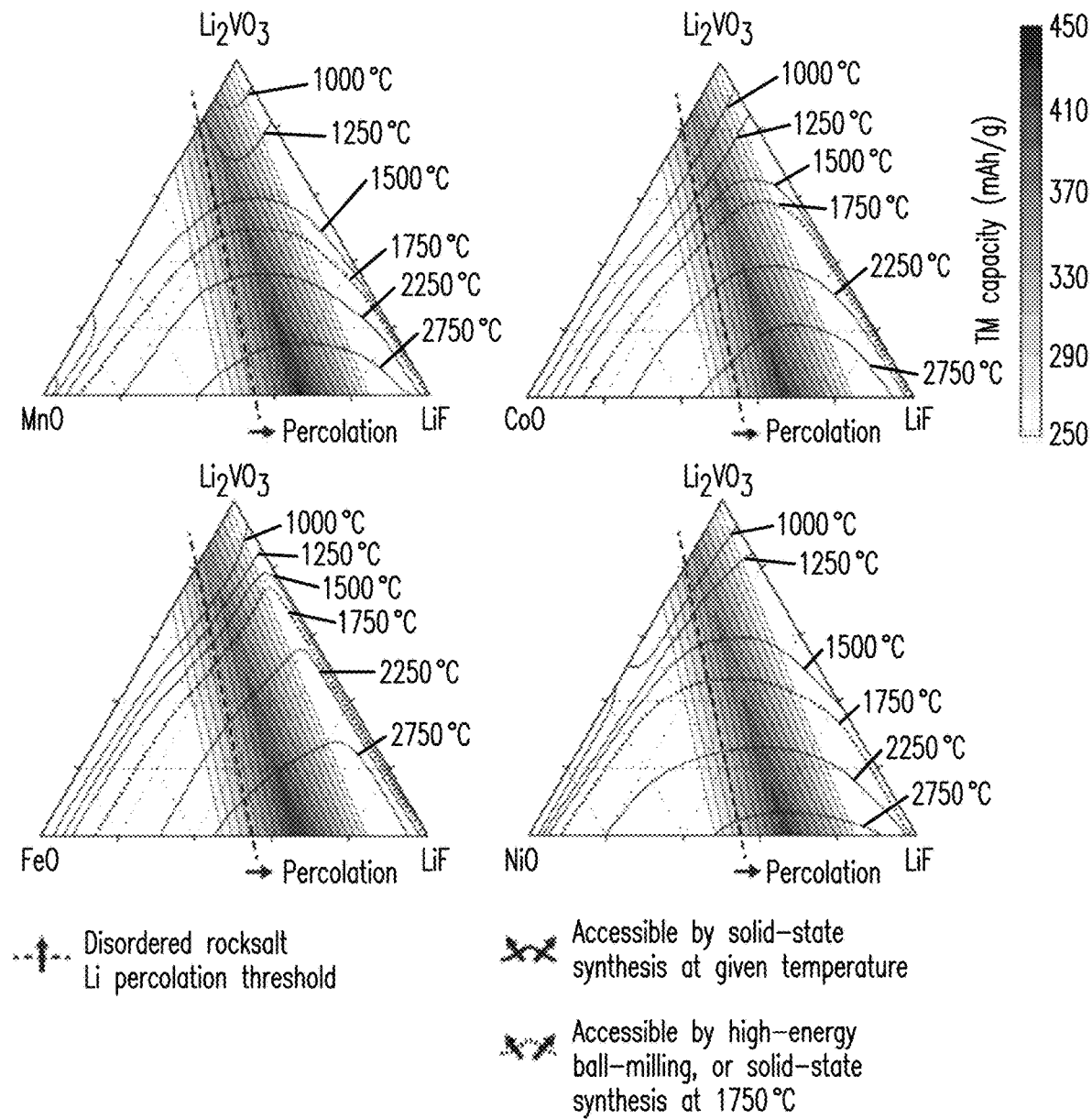
FIG. 3 is a phase diagram of a disordered rocksalt vanadium-based oxyfluoride system according to one embodiment of the present invention
Figure 4:
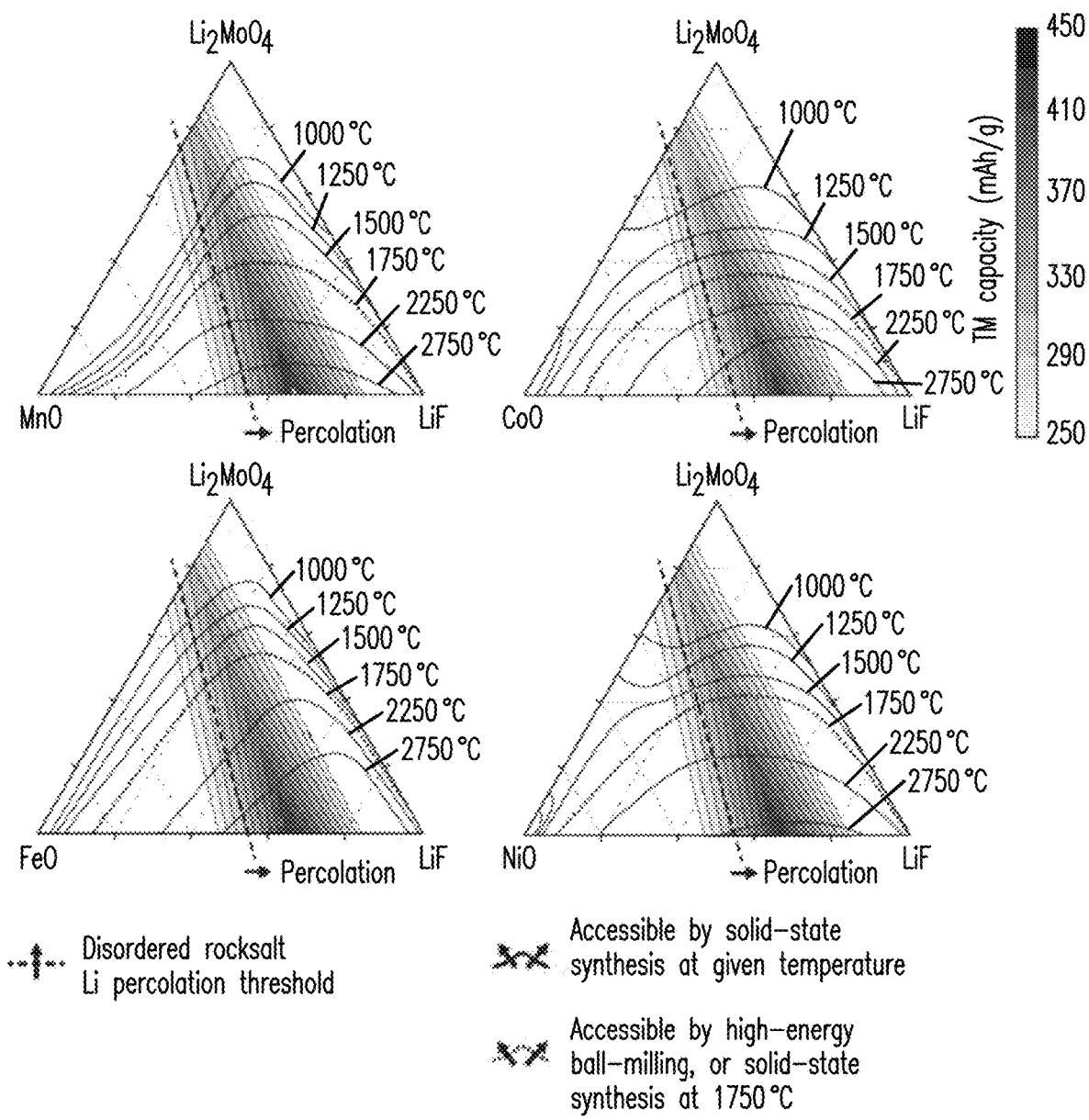
FIG. 4 is a phase diagram of a disordered rocksalt molybdenum-based oxyfluoride system according to another embodiment of the present invention

For instance, FIGS. 3 and 4 show the composition space and thermal stability of the systems contemplated under aspects of the present invention. FIG. 3 shows the composition space of mixed transition metal disordered Li-excess oxyfluoride rocksalt structures based on $Mn^{2+}$, $Fe^{2+}$, $Co^{2+}$, or $Ni^{2+}$, and $V^{4+}$, while FIG. 4 shows the composition space of mixed transition metal disordered Li-excess oxyfluoride rocksalt structures based on $Mn^{2+}$, $Fe^{2+}$, $Co^{2+}$, or $Ni^{2+}$, and $Mo^{5+}$. As can be seen, FIGS. 3 and 4 define the synthetic accessibility of these systems by solid state synthesis and high-energy ball milling at a given temperature. The contours in the phase diagrams illustrate the composition regions stable at the temperature associated with the contour, starting from the endpoint phases. In the case of solid state synthesis, the contour temperature is the minimum annealing temperature needed to form the target composition. In the case of high-energy ball-milling, any composition stable at or below 1750° C. is synthetically accessible.

Additionally, the phase diagrams can also show the compositions that fall above the disordered rocksalt Li percolation threshold (i.e., Li occupies at least 55% of the cation sublattice). For instance, FIGS. 3 and 4 show compositions that satisfy the disordered rocksalt Li percolation threshold. Indeed, the present invention contemplates compositions that fall above the Li percolation threshold. Furthermore, the phase diagrams may also show the reversible capacity achievable from all transition metals in the system. For example, FIGS. 3 and 4 show the expected total capacity from the $Mn^{2+/4+}$, $Fe^{2+/4+}$, $Co^{2+/4+}$, or $Ni^{2+/4+}$, and $V^{4+/5+}$ redox couples as well as the $Mn^{2+/4+}$, $Fe^{2+/4+}$, $Co^{2+/4+}$, or $Ni^{2+/4+}$, and $Mo^{5+/6+}$ redox couples.

In one embodiment, mechanochemical synthesis may be employed for the preparation of the disordered rocksalt oxides and oxyfluorides of the present invention. In this aspect, the process for manufacturing the disordered rocksalt oxides and oxyfluorides of the present invention includes a step for providing the necessary precursors for producing the oxides and oxyfluorides. For example, the process may include a step for providing at least one lithium-based precursor, at least one low-valent transition metal precursor, at least one high-valent transition metal precursor, and optionally at least one fluorine-based precursor. In this aspect, the low-valent transition metal precursor may be a manganese-based precursor, a cobalt-based precursor, an iron-based precursor, or a nickel-based precursor. Similarly, the high-valent metal precursor may be a vanadium-based precursor or a molybdenum-based precursor.

As will be apparent to one of ordinary skill in the art, any precursor that provides the elemental composition of the desired disordered oxide or oxyfluoride may be utilized in the present invention. However, in one embodiment, the lithium-based precursor may include $Li_2CO_3$, $Li_2O$, or LiOH. In another embodiment, the low-valent transition metal precursor may include MnO, CoO, FeO, NiO, or combinations thereof. In still another embodiment, the high-valent transition metal precursor may include $VO_2$, $MoO_2$, $MoO_3$, or combinations thereof. Similarly, a preferred fluorine-based precursor includes LiF.

After selection of the desired precursors, stoichiometric amounts of the lithium-based, low-valent transition metal-based, high-valent transition metal-based, and fluorine-based precursors are mixed, where the lithium-based precursor may be added in up to 10% excess of the desired lithium content. Any mechanical means for sufficiently mixing the precursors may be utilized. The duration of the mixing will depend on the type of mechanical means utilized and the speed at which the precursors are mixed. For example, in one embodiment, the precursors may be mixed in a ball mill (under the present invention mixing can include a separate mixing stage prior to mill receipt or mixing can be considered in the context of providing the material to be milled as to form an initial mix within the mill whereupon the received mix is milled to a final mix state). In this aspect, the precursors may undergo mixing in the ball mill for a time period between 6 and 12 hours at about 300 rpm.

In still another embodiment, the mixed precursors may undergo high-energy ball milling. In this aspect, high-energy ball milling is performed at a higher speed (rpm) than ball milling. For example, high-energy ball milling may be performed at a speed of 450 rpm to 550 rpm. Additionally, according to the present invention, the milling step may occur at room temperature and under an argon atmosphere.

The mixed precursors may undergo milling for 20 to 200 hours. In another embodiment, the mixed precursors may undergo milling for about 40 hours to about 80 hours. In still another embodiment, the mixed precursors may undergo milling for about 50 hours to about 70 hours. For example, the mixed precursors may undergo milling for about 60 hours. After the milling step, the disordered rocksalt oxides and oxyfluorides of the present invention are formed. The resulting oxides and oxyfluorides may be ground into fine powder and prepared as a cathode film.

Under embodiments of the present invention, a solid state reaction synthesis may be employed for the preparation of the disordered rocksalt oxides and oxyfluorides of the present invention. For example, solid state synthesis may be employed to prepare the molybdenum-based oxides and oxyfluorides of the present invention. Solid state synthesis may also be employed to prepare the vanadium-based metal oxides of the present invention.

The disordered rocksalt oxides and oxyfluorides of the present invention provide improved electrochemical performance. For example, the disordered rocksalt oxides and oxyfluorides of the present invention that include three active transition metal couples—two from the low-valent metal (e.g., $Mn^{2+/4+}$) and one from the high-valent metal—provide highly reversible and high-energy density cathodes. For example, the disordered rocksalt oxides and oxyfluorides of the present invention demonstrate minimal change in capacity and voltage after repeated cycling curves at a high cutoff voltage. In other words, the oxides and oxyfluorides of the present invention are highly reversible, which contrasts with other reported Li-excess cathodes that routinely lose much of their capacity after the first few cycles due to oxygen loss or are reversible only at low voltages. Without being bound to any particular theory, it is believed that the high transition metal content demonstrated in the oxides and oxyfluorides of the present invention (which the capacity thereof is balanced to exactly match the Li content) eliminates the need for oxygen capacity on charge/discharge. This, in turn, promotes reversible electrochemical performance.

In addition, the disordered rocksalt oxides and oxyfluorides of the present invention achieve high discharge capacities as well as high energy densities. Under embodiments of the present invention, the oxides and oxyfluorides achieve discharge capacities of about 250 mAh/g to about 400 mAh/g. Embodiments of the present invention feature oxides and achieving discharge capacities of about 275 mAh/g to about 380 mAh/g. In still other embodiments, the oxides and oxyfluorides of the present invention achieve discharge capacities of about 290 mAh/g to about 350 mAh/g. For instance, the oxides and oxyfluorides of the present invention may achieve a discharge capacity of about 310 mAh/g. The oxides and oxyfluorides of the present invention may achieve these discharge capacities at an average voltage of about 2.5V to about 3V. In additional embodiments, the oxides and oxyfluorides of the present invention may achieve these discharge capacities at an average voltage of about 2.6V to about 2.75V.

Accordingly, embodiments of the disordered rocksalt oxides and oxyfluorides of the present invention achieve energy densities of about 700 Wh/kg to about 900 Wh/kg. Embodiments of the disordered rocksalt oxides and oxyfluorides of the present invention also achieve energy densities of about 740 Wh/kg to about 875 Wh/kg. In still further embodiments, the disordered rocksalt oxides and oxyfluorides of the present invention achieve energy densities of about 760 Wh/kg to about 860 Wh/kg. For example, the disordered rocksalt oxides and oxyfluorides may achieve energy densities as much as 781 Wh/kg at a 4.6V cutoff voltage and 862 Wh/kg at a 4.8 cutoff voltage.

Figure 5:
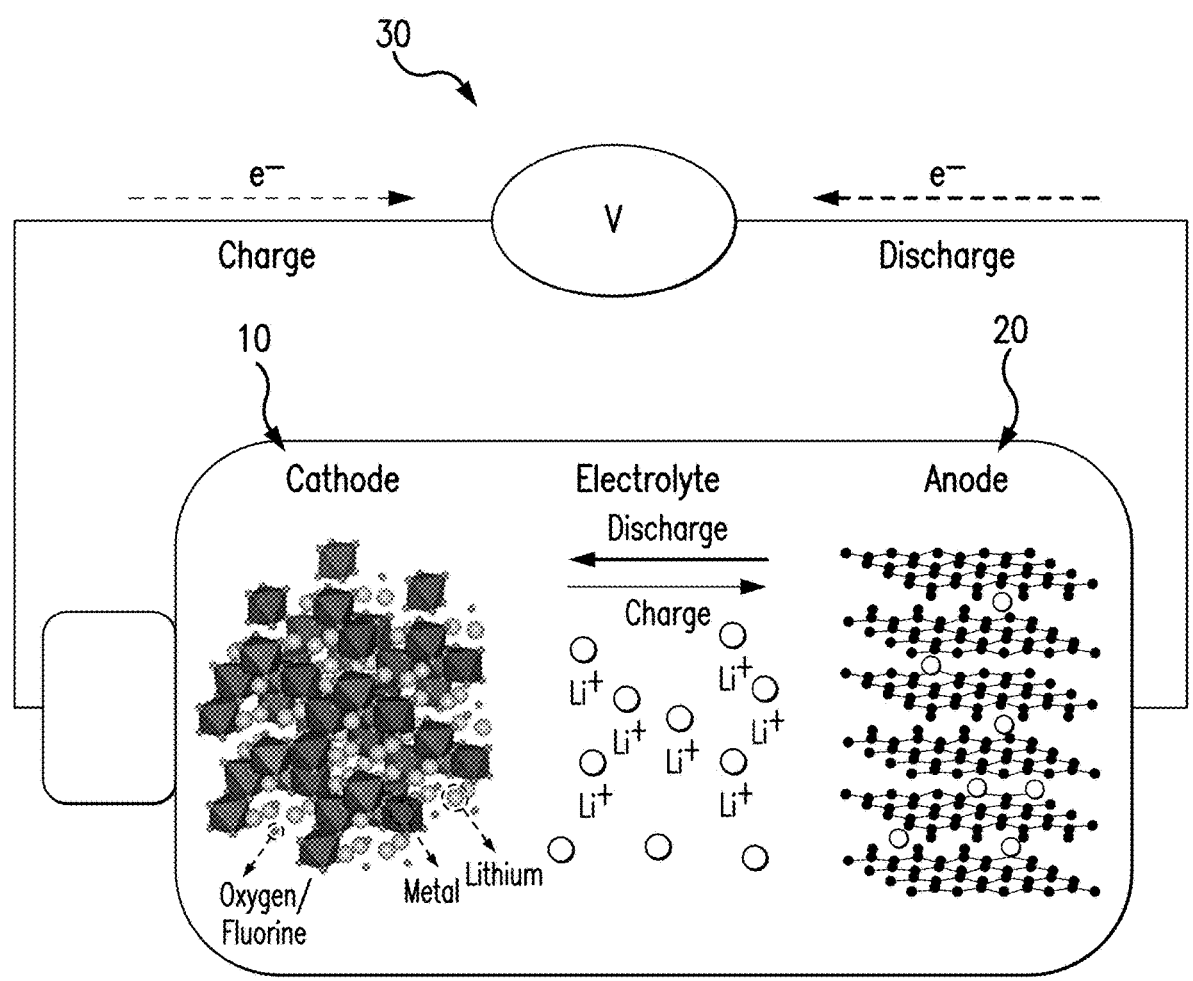
FIG. 5 shows a schematic diagram of a rechargeable lithium-ion battery.

The present disclosure also provides lithium batteries and lithium-ion cells including an electrode material, for example, a cathode, composed of the disordered rocksalt oxides and oxyfluorides as described herein. In one embodiment, the disordered rocksalt oxides and oxyfluorides produced in accordance with the present invention may be used as cathodes in lithium-ion rechargeable batteries. FIG. 5 shows a schematic diagram of a rechargeable lithium-ion battery. As shown in FIG. 5, reversible shuttling of Li ions between the cathode 10 and the anode 20 enables a rechargeable lithium-ion battery 30. The disordered rocksalt oxides and oxyfluorides described herein (above and below) may be used as cathodes in lithium-ion rechargeable batteries for products such as portable electronic devices, automobiles including electric vehicles and hybrid electric vehicles, and energy storage systems. The disordered rocksalt oxides and oxyfluorides described herein (above and below) may also be used for high energy density Li-ion cathode battery cathode materials, where cathode energy density is an important factor to overall cell performance. For example, the disordered rocksalt oxides and oxyfluorides of the present invention may be used in long-life secondary Li-ion cells, where reversibility is a desirable feature for achieving consistent performance over many charge/discharge cycles.

An additional aspect of the invention is directed at disordered rocksalt lithium manganese-vanadium oxides and oxyfluorides that are designed in an effort to optimize maximal accessible Li capacity and feature a mixture of a low-valent transition metal capable of two-electron redox ($Mn^{2+}$, $Fe^{2+}$, $Co^{2+}$, $Ni^{2+}$), a high-valent transition metal charge compensator capable of a least one-electron redox ($V^{3+}$, $V^{4+}$, $Mo^{4+}$, $Mo^{5+}$), and a mixture of $O^{2-}$ and (when present) $F^-$ on the anion lattice. In these mixtures, it is possible to obtain a range of synthetically accessible, high capacity disordered rocksalt materials which rely primarily on high voltage transition metal redox couples providing both high energy density and reversibility.

During a performance of two compounds $Li_{1.143}Mn_{0.286}V_{0.572}O_2$ and $Li_{1.171}Mn_{0.343}V_{0.486}O_{1.8}F_{0.2}$ in the Li—Mn—V—O—F space and a first-principles model of the electrochemical behavior of $Li_{1.171}Mn_{0.343}V_{0.486}O_{1.8}F_{0.2}$, two mechanisms were identified that limited the accessible Li capacity in these materials: formation of strong Li—F bonds and the migration of Li to very stable tetrahedral sites at high charge states. Quantifying these mechanisms, a map of practically accessible Li capacity was computed in the Li—Mn—V—O—F space and used to design two new compounds, (LR-LMVO) and (LR-LMVF20) as described below, that provide higher capacity and energy density than the compounds reported earlier.

For instance, a compound with the chemical formula $Li_xMn_aV_bO_{2-y}$ ($1.10 \leq x \leq 1.33$, $0.1 \leq a \leq 0.41$, $0.39 \leq b \leq 0.67$, $0 \leq y \leq 0.30$) will have 0.4y-0.8y Li inaccessible sites due to binding to F (when present), and 0.10x-0.12x Li inaccessible sites due to tetrahedral Li formation, where the two effects, above, are not additive but rather act independently of each other, i.e. the two effects limit accessible Li capacity in parallel rather than additively. Based on these findings, the disordered rocksalt oxide $Li_{1.2}Mn_{0.2}V_{0.6}O_2$ (LR-LMVO) was derived as a material balancing practically-accessible Li capacity and theoretical transition metal capacity (2a+b in $Li_xMn_aV_bO_{2-y}F_y$), providing a maximal accessible capacity in this space. An analogous disordered-rocksalt oxyfluoride $Li_{1.23}Mn_{0.255}V_{0.515}O_{1.8}F_{0.2}$ (LR-LMVF20) was similarly derived as a compound similarly balancing accessible Li capacity with transition metal capacity, but exhibiting slightly better cycling stability due to the surface passivation offered by F.

Experimentally realizing these two compounds, LR-LMVO and LR-LMVF20, confirmed their synthetic accessibility and superior performance. These results illustrate the benefits offered by optimization rules for maximizing accessible Li capacity developed under the present invention. As a result of our study, it was determined that accessibility of highly oxidized transition metal states ($Mn^{4+}$ and $V^{5+}$) is not a limiting mechanism in these materials. Thus, the origin of limited capacity is considered to must lie in Li accessibility related to the configuration of Li in the material, which was circumvented by introducing excess total Li capacity.

Figure 8:
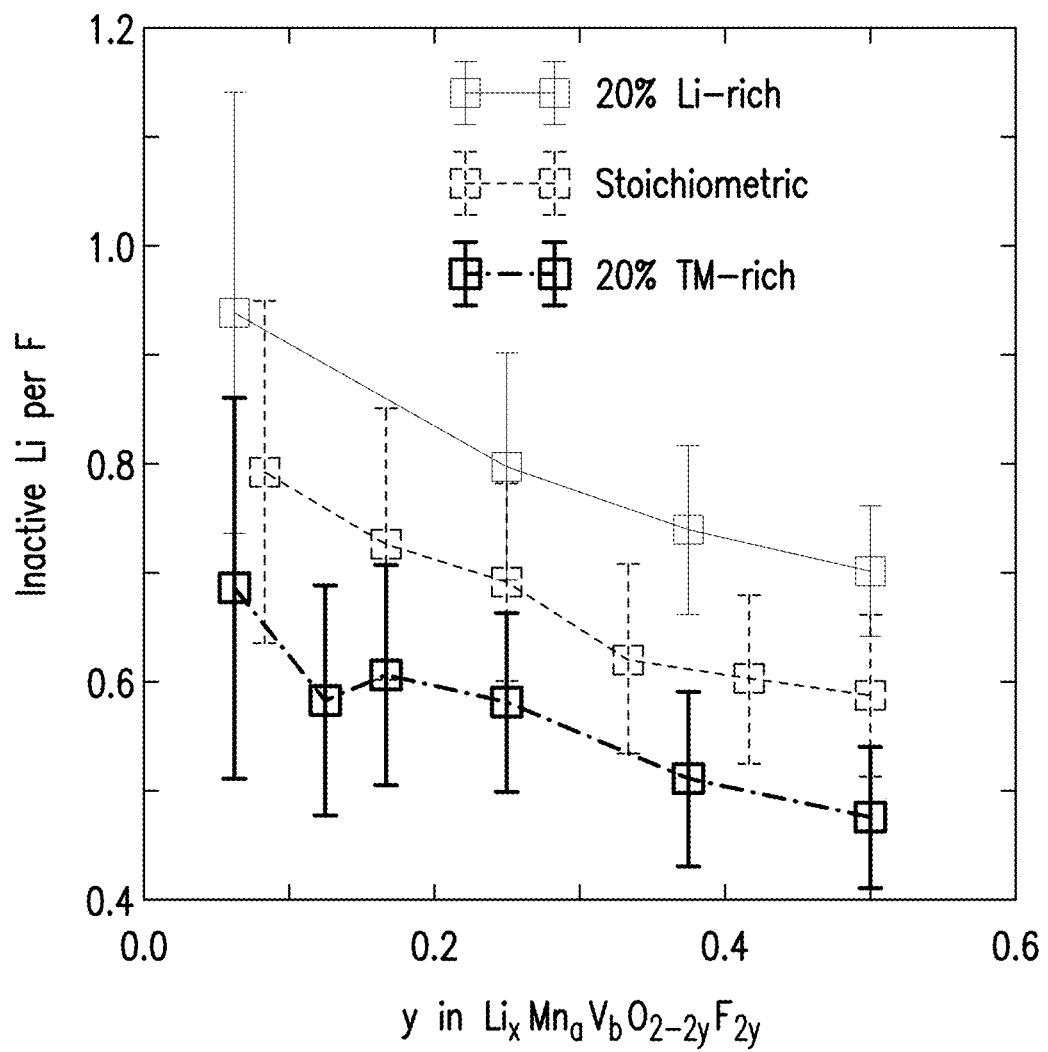
FIG. 8 shows the average amount of Li made inaccessible up to 4.6 V by high-voltage F-binding as a function of fluorination level and Li capacity with respect to transition metal capacity, where "stoichiometric" means total Li capacity (x) equals transition metal capacity (2a+b), while 20% Li-rich and TM-rich refer to compositions with excess Li or TM capacity (x=1.2 (2a+b) and 1.2x=(2a+b), respectively).

With reference to the aforementioned advantageous LR-LMVO and LR-LMVF20 falling under a second aspect of the present invention, FIG. 8 shows the average amount of Li made inaccessible up to 4.6 V by high-voltage F-binding as a function of fluorination level and Li capacity with respect to transition metal capacity, where "stoichiometric" means total Li capacity (x) equals transition metal capacity (2a+b), while 20% Li-rich and TM-rich refer to compositions with excess Li or TM capacity (x=1.2 (2a+b) and 1.2x=(2a+b), respectively).

Figure 9:
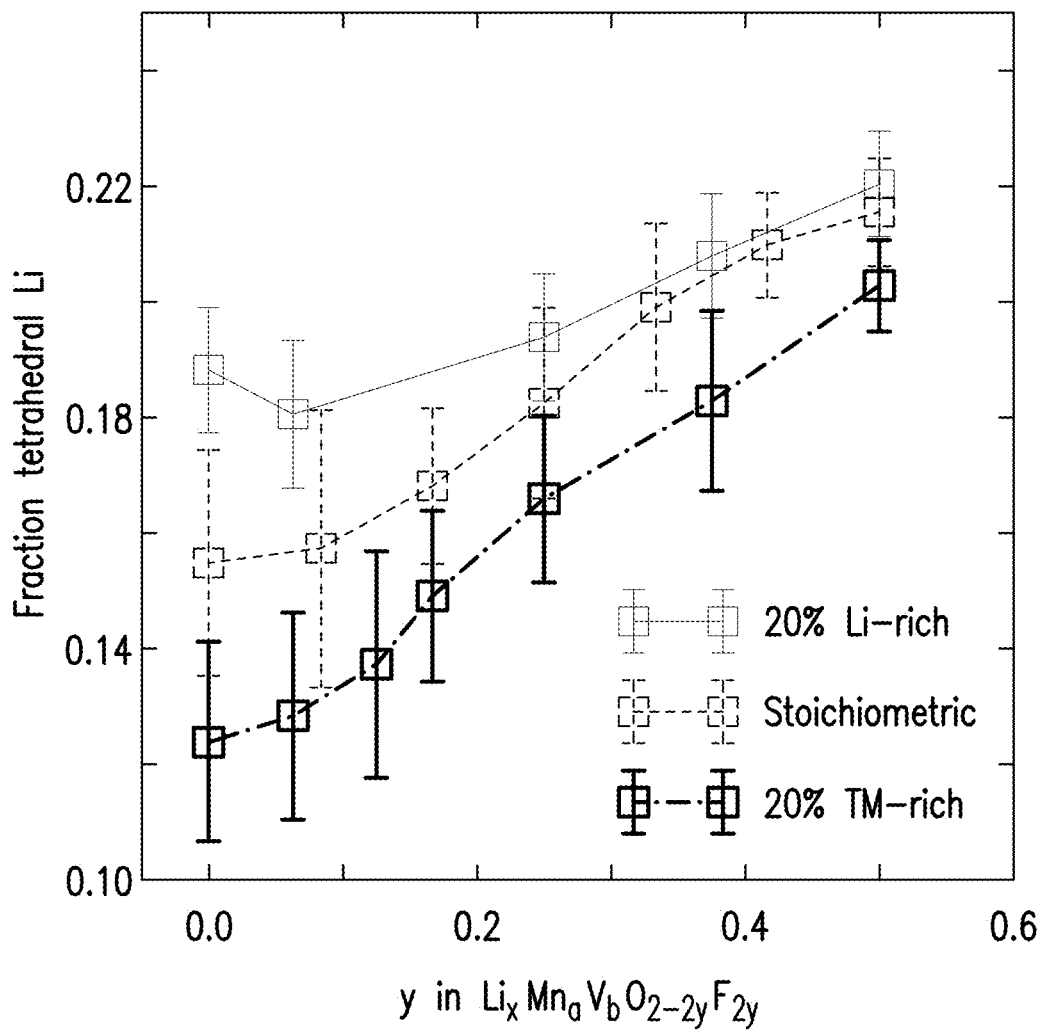
FIG. 9 shows expected fraction of Li to migrate to a tetrahedral sites during charging to 4.6V. 4.6V is a practical voltage limit given experimental trends on electrolyte stability and cell reversibility.

FIG. 9 shows expected fraction of Li to migrate to a tetrahedral sites during charging to 4.6V. 4.6V is a practical voltage limit given experimental trends on electrolyte stability and cell reversibility.

Figure 10:
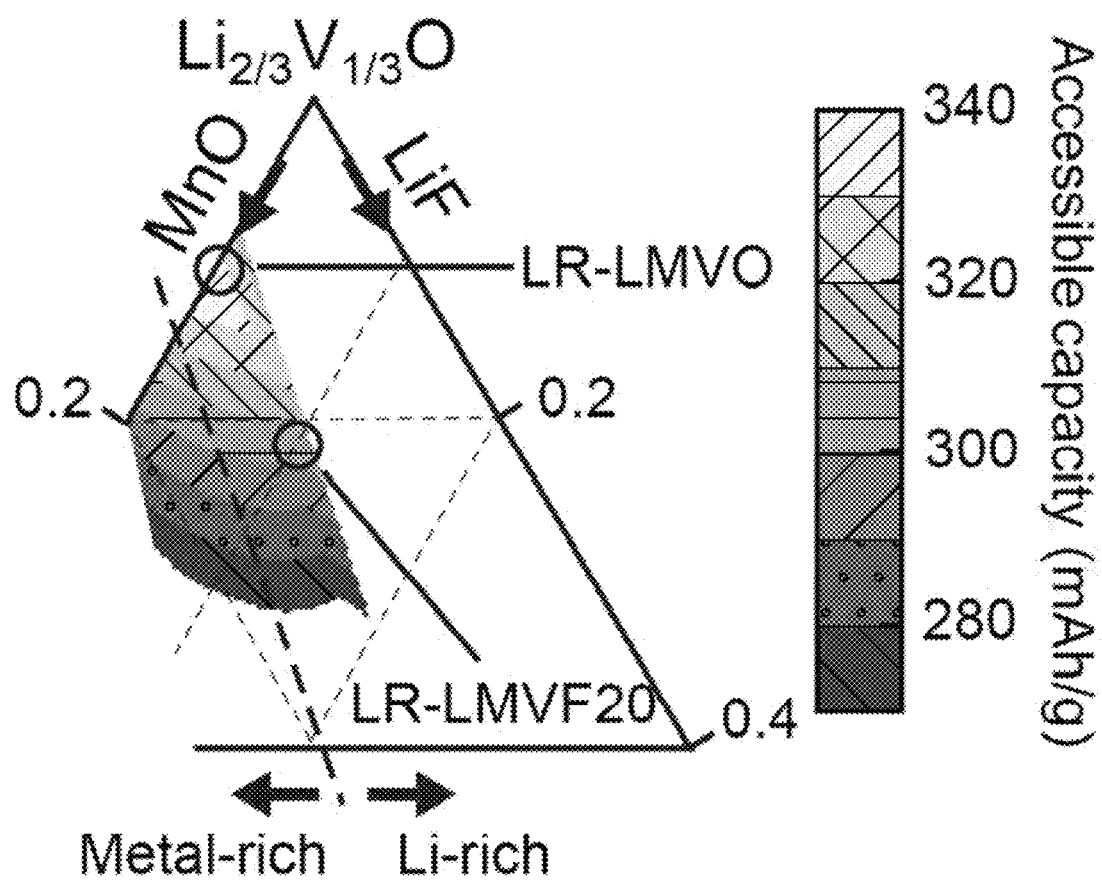
FIG. 10 shows the predicted first-charge capacity between 1.5V and 4.6V among low-F mixed $Mn^{2+}/V^{4+}$ oxyfluorides, accounting for Li made inaccessible by F binding and tetrahedral Li formation. The experimentally tested LR-LMVO and LR-LMVF20 compounds are marked.

FIG. 10 shows the predicted first-charge capacity between 1.5V and 4.6V among low-F mixed $Mn^{2+}/V^{4+}$ oxyfluorides, accounting for Li made inaccessible by F binding and tetrahedral Li formation. The experimentally tested LR-LMVO and LR-LMVF20 compounds are marked in FIG. 10.

EXAMPLES

The following non-limiting examples demonstrate disordered rocksalt lithium metal oxides and oxyfluorides, A first set of examples (Examples Category 1) are directed at a first aspect of the present invention featuring disordered rocksalt vanadium and molybdenum-based lithium metal oxides and oxyfluorides, A second set of examples (Examples Category 2) are directed at a second aspect of the invention featuring disordered rocksalt lithium manganese-vanadium oxides and oxyfluorides having the above described advantageous attributes. The Examples are merely illustrative of the preferred embodiments of the present invention, and are not to be construed as limiting the invention, the scope of which is defined by the appended claims.

Examples Category 1

The following inventive disordered rocksalt vanadium and molybdenum-based oxides and oxyfluorides were synthesized:

Li—Mn—V—O—F type having the general formula: $Li_xMn_aV_bO_{2-y}F_y$, $1.1 \leq x \leq 1.2$, $0.3 \leq a \leq 0.4$, $0.4 \leq b \leq 0.6$, $0 \leq y \leq 0.3$ where x=1.143, a=0.286, b=0.572, y=0 ($Li_{1.143}Mn_{0.286}V_{0.572}O_2$) ("Inventive LMV1");

Li—Mn—V—O—F type having the general formula: $Li_xMn_aV_bO_{2-y}F_y$, $1.1 \leq x \leq 1.2$, $0.3 \leq a \leq 0.4$, $0.4 \leq b \leq 0.6$, $0 \leq y \leq 0.3$ where x=1.156, a=0.315, b=0.528, y=0.1 ($Li_{1.156}Mn_{0.315}V_{0.528}O_{1.9}F_{0.1}$) ("Inventive LMV2");

Li—Mn—V—O—F type having the general formula: $Li_xMn_aV_bO_{2-y}F_y$, $1.1 \leq x \leq 1.2$, $0.3 \leq a \leq 0.4$, $0.4 \leq b \leq 0.6$, $0 \leq y \leq 0.3$ where x=1.171, a=0.343, b=0.486, y=0.2 ($Li_{1.171}Mn_{0.343}V_{0.486}O_{1.8}F_{0.2}$) ("Inventive LMV3"); and Li—Mn—V—O—F type having the general formula: $Li_xMn_aV_bO_{2-y}F_y$, $1.1 \leq x \leq 1.2$, $0.3 \leq a \leq 0.4$, $0.4 \leq b \leq 0.6$, $0 \leq y \leq 0.3$ where x=1.186, a=0.371, b=0.443, y=0.3 ($Li_{1.186}Mn_{0.371}V_{0.443}O_{1.7}F_{0.3}$) ("Inventive LMV4").

In preparing the inventive compounds under Example Category 1, $Li_2O$ (Sigma-Aldrich, 97% min), MnO (Sigma-Aldrich, 99.99%), $VO_2$ (Sigma-Aldrich, 99.9%), and LiF (Alfa Aesar, 99.99%) were used as precursors. Stoichiometric amounts of the precursors were mixed using a Retsch PM 200 Planetary Ball Mill at a rate of 300 rpm for 12 hours, with the exception of $Li_2O$ which was added in 10% excess of the desired Li content. The mixed precursors (1 g in total) were then ball-milled under Argon using Retsch PM 200 Planetary Ball Mill at a rate of 500 rpm. Inventive LMV1 was ball-milled for 40 hours. Inventive LMV2 was ball-milled for 50 hours. Inventive LMV3 was ball-milled for 60 hours. Inventive LMV4 was ball-milled for 80 hours. The resulting compounds were obtained as a fine powder from the ball-milling procedure.

To prepare cathode films, the powders of each of Inventive LMV1, Inventive LMV2, Inventive LMV3, and Inventive LMV4 were separately manually mixed with carbon black (Timcal, Super P) in the weight ratio of 70:20. Polytetrafluoroethylene (PTFE, DuPont, Teflon 8C) ("PTFE") was added to each mixture as a binder. Each resulting cathode film included the respective Inventive LMV1, Inventive LMV2, Inventive LMV3, or Inventive LMV4; carbon black; and PTFE in the weight ratio of 70:20:10. The components were manually mixed for 30 minutes and rolled into a thin film inside an argon-filled glove box. To assemble a cell for regular cycling tests, 1 M of $LiPF_6$ in ethylene carbonate ("EC") and dimethyl carbonate ("DMC") solution (1:1, Techno Semichem), glass microfiber filters (GE Whatman), and Li metal foil (FMC) were used as the electrolyte, the separator, and the counter electrode, respectively. 2032 coin cells are assembled inside an argon-filled glove box and tested on a battery tester (Arbin) at room temperature in galvanostatic modes. The loading density of the cathode film was approximately 5 mg/cm$^2$. The specific capacity was calculated based on the amount of oxyfluoride ($Li_xMn_aV_bO_{2-y}F_y$) in the cathode film (i.e., 70 weight percent).

Figure 6:
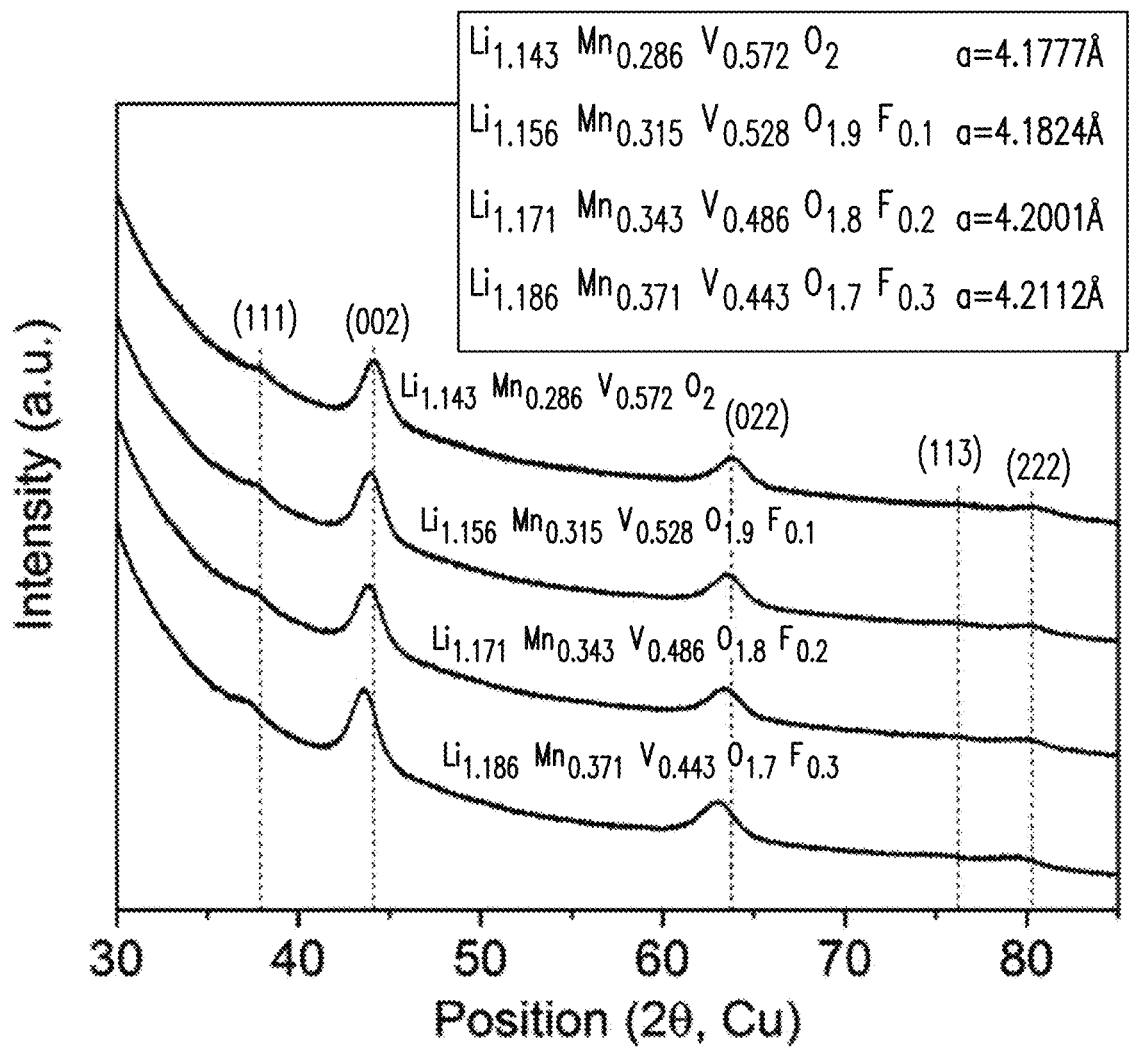
FIG. 6 shows the X-ray diffraction ("XRD") patterns of $Li_{1.143}Mn_{0.286}V_{0.572}O_2$ ("Inventive LMV1"); $Li_{1.156}Mn_{0.315}V_{0.528}O_{1.9}F_{0.1}$ ("Inventive LMV2"); $Li_{1.171}Mn_{0.343}V_{0.486}O_{1.8}F_{0.2}$ ("Inventive LMV3"); and $Li_{1.186}Mn_{0.371}V_{0.443}O_{1.7}F_{0.3}$ ("Inventive LMV4")

X-ray diffraction ("XRD") patterns for as-prepared compounds were collected on a Rigaku MiniFlex (Cu source) in the 2θ range of 5-85°. FIG. 6 shows the XRD patterns of the Inventive LMV1, Inventive LMV2, Inventive LMV3, and Inventive LMV4 compounds. FIG. 6 confirms that each of the target compositions, Inventive LMV1, Inventive LMV2, Inventive LMV3, and Inventive LMV4, are phase pure products. In other words, these compounds were successfully prepared by high-energy ball milling.

Figure 7A:
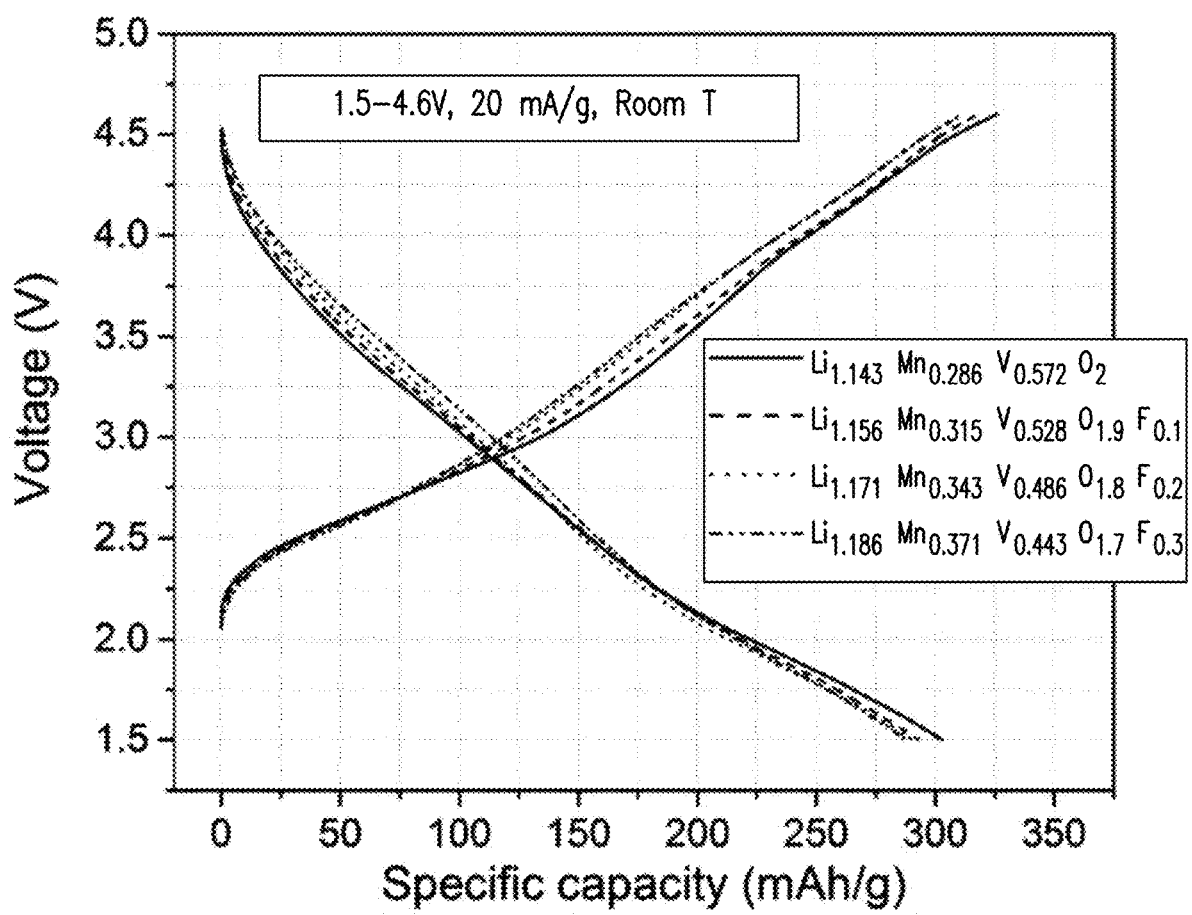
FIG. 7A shows the first cycle electrochemical performance of Inventive LMV1, Inventive LMV2, Inventive LMV3, and Inventive LMV4.

The electrochemical properties of the Inventive LMV1, Inventive LMV2, Inventive LMV3, and Inventive LMV4 cathodes were also tested. FIG. 7A shows the first cycle electrochemical performance of the Inventive LMV1, Inventive LMV2, Inventive LMV3, and Inventive LMV4 compounds at a 4.8V cutoff voltage. Each of the inventive compounds demonstrated similarly high capacity and voltage, approaching up to 90% of theoretical transition metal capacity.

Figure 7B:
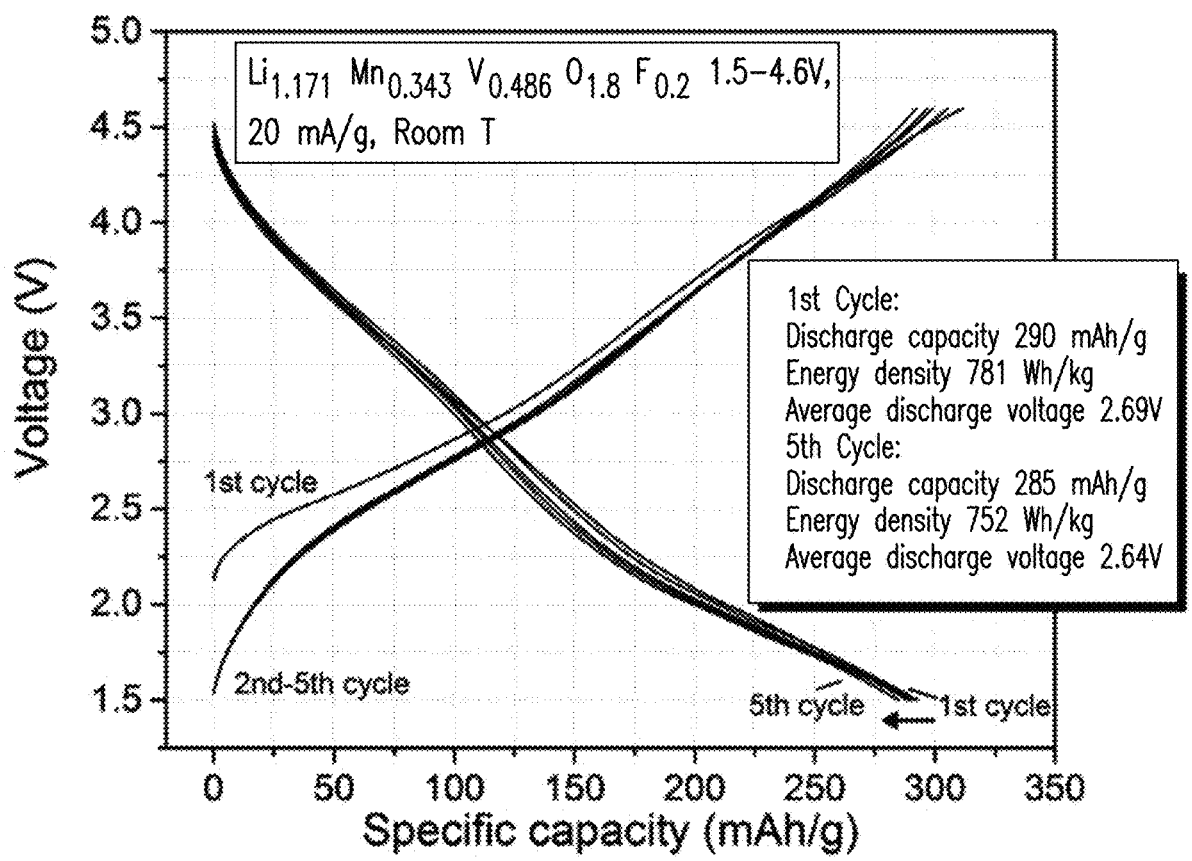
FIGS. 7B and 7C show the multiple charge/discharge cycle performance of Inventive LMV3.
Figure 7C:
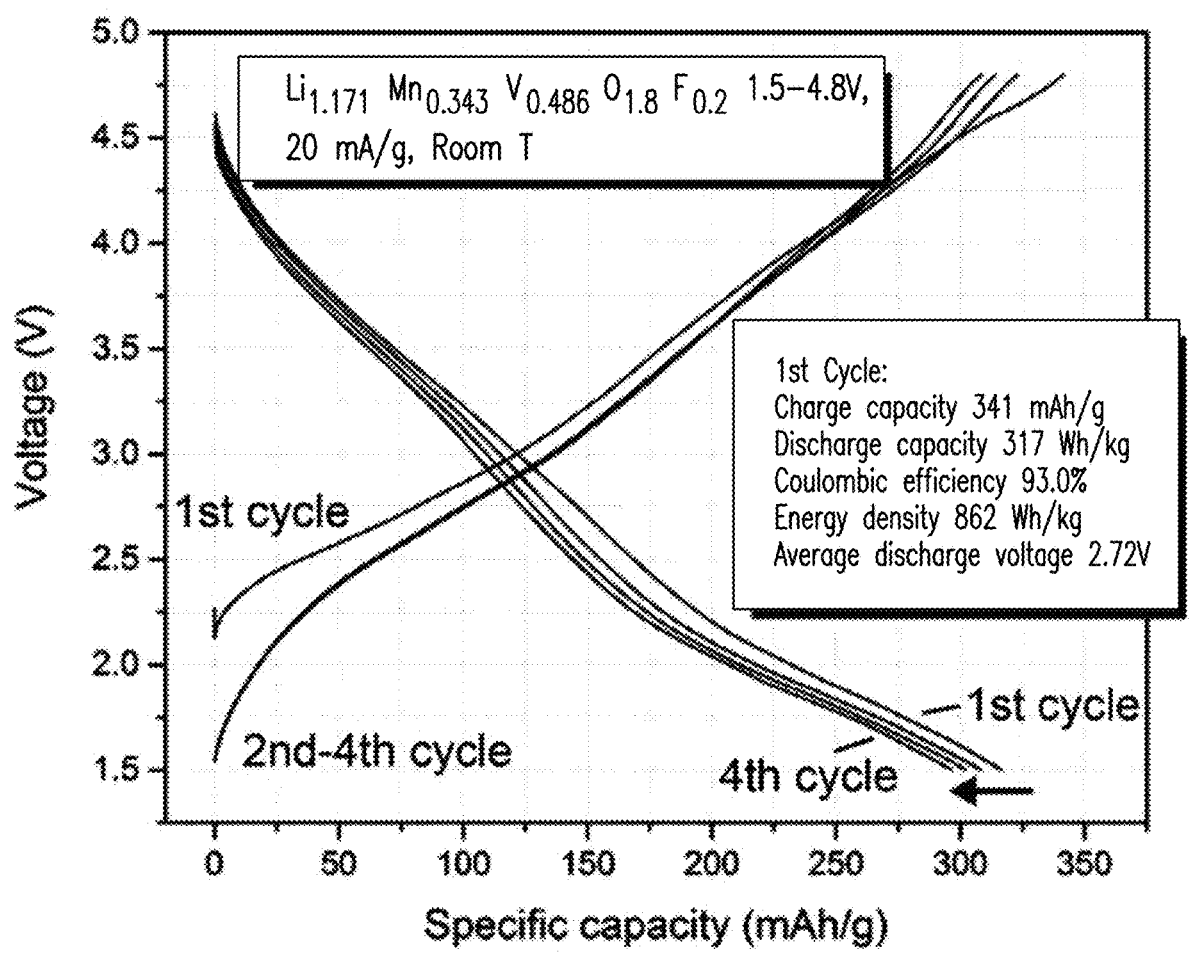

FIGS. 7B and 7C show multiple charge/discharge cycle performance of the Inventive LMV3 compound at a 4.6V and 4.8V cutoff voltage, respectively. As shown in FIG. 7B, the Inventive LMV3 compound achieved a discharge capacity up to about 290 mAh/g at an average voltage of 2.69V and a resulting energy density of 781 Wh/kg at the 4.6V cutoff voltage. The energy density achieved at the 4.6 V cutoff voltage is highly reversible, as evidenced by the repeated cycling curves shown in FIG. 7B, which exhibit below 2% change in discharge capacity and average voltage within the first 5 cycles. Additionally, as shown in FIG. 7C, the Inventive LMV3 compound achieved a discharge capacity of about 317 mAh/g at an average voltage of 2.72V and a resulting energy density of 862 Wh/kg at the 4.8V cutoff voltage.

Examples Category 2

Under Example Category 2 examples are provided that are directed at the aforementioned disordered rocksalt lithium manganese-vanadium oxides and oxyfluorides LR-LMVO and LR-LMVF which were prepared using a mechanochemical synthesis. $Li_2O$ (Sigma-Aldrich, 99%), MnO (Sigma-Aldrich 99.99%), $VO_2$ (Sigma-Aldrich 99.99%), and in the oxyfluorides case, LiF (Alfa Aesar, 99.99%), are used as precursors and stoichiometrically mixed (except with $Li_2O$ 10% in excess) using a Retsch PM200 Planetary Ball Mill at a rate of 300 rpm for 12 hrs. The mixed precursors were then ball-milled for 50 hours under Argon using Retsch PM 200 Planetary Ball Mill at a rate of 500 rpm.

To prepare a cathode film, the powder of $Li_xMn_aV_bO_{2-y}F_y$ and carbon black (Timcal, Super P) were first mixed manually for 40 minutes in the weight ratio of 70:20. Then, polytetraflouroethylene (PTFE, DuPont, Teflon 8C) was added to the mixture as a binder, such that a cathode film consists of $Li_xMn_aV_bO_{2-y}F_y$, carbon black, and PTFE in the weight ratio of 70:20:10. The components were manually mixed for another 30 minutes and rolled into a thin film inside an argon glove box. To assemble a cell for regular cycling tests, 1M of $LiPF_6$ in ethylene carbonate (EC) and dimethyl carbonate (DMC) solution (1:1, Techno Semichem), glass microfiber filters (GE Whatman), and Li metal foil (FMC) were used as the electrolyte, the separator, and the counter electrode, respectively, 2032 coin cells were assembled inside an argon-filled glove box and tested on a battery tester (Arbin) at room temperature in galvanostatic modes. The loading density of the cathode film was about 5 mg/cm$^2$. The specific capacity is calculated based on the amount of $Li_xMn_aV_bO_{2-y}F_y$ (70 wt %) in the cathode film. X-ray diffraction (XRD) patterns for as prepared compounds are collected on a Rigaku MiniFlex (Cu source) in the 2θ range of 5-85 degrees.

The development and experimental confirmation of the design rule for Li capacity with respect to transition metal capacity yields a range of optimal compounds for high charge capacity, where $Mo^{5+}$ has included by analogy to $V^{4+}$ as a redox-active high valent transition metal, as in our previous disclosure: $Li_xMn_aV_bO_{2-y}F_y$ for 0.1≤a≤0.7, 0.1≤b≤0.7, 0.1≤y≤0.7, (2a+b)≤x≤1.3*(2a+b); and $Li_xMn_a$-$Mo_bO_{2-y}$Fy for 0.1≤a≤0.7, 0.1≤b≤0.7, 0.1≤y≤0.7, (2a+b)≤x≤1.3*(2a+b).

Figure 11A:
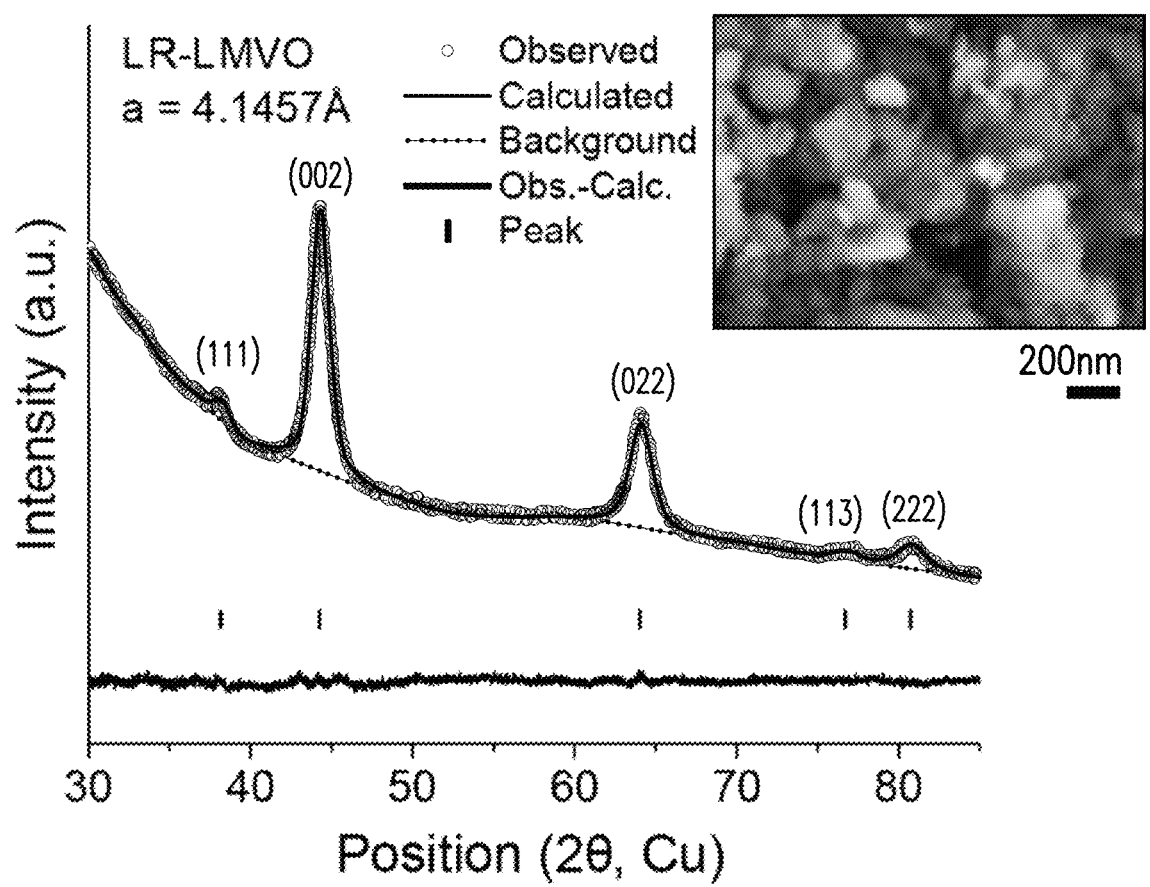
FIGS. 11A and 11B show X-ray diffraction patterns and scanning electron microscopy images of the as-synthesized (a) LR-LMVO and (b) LR-LMVF20 materials, respectively, revealing that the products are phase pure disordered rocksalts.
Figure 11B:
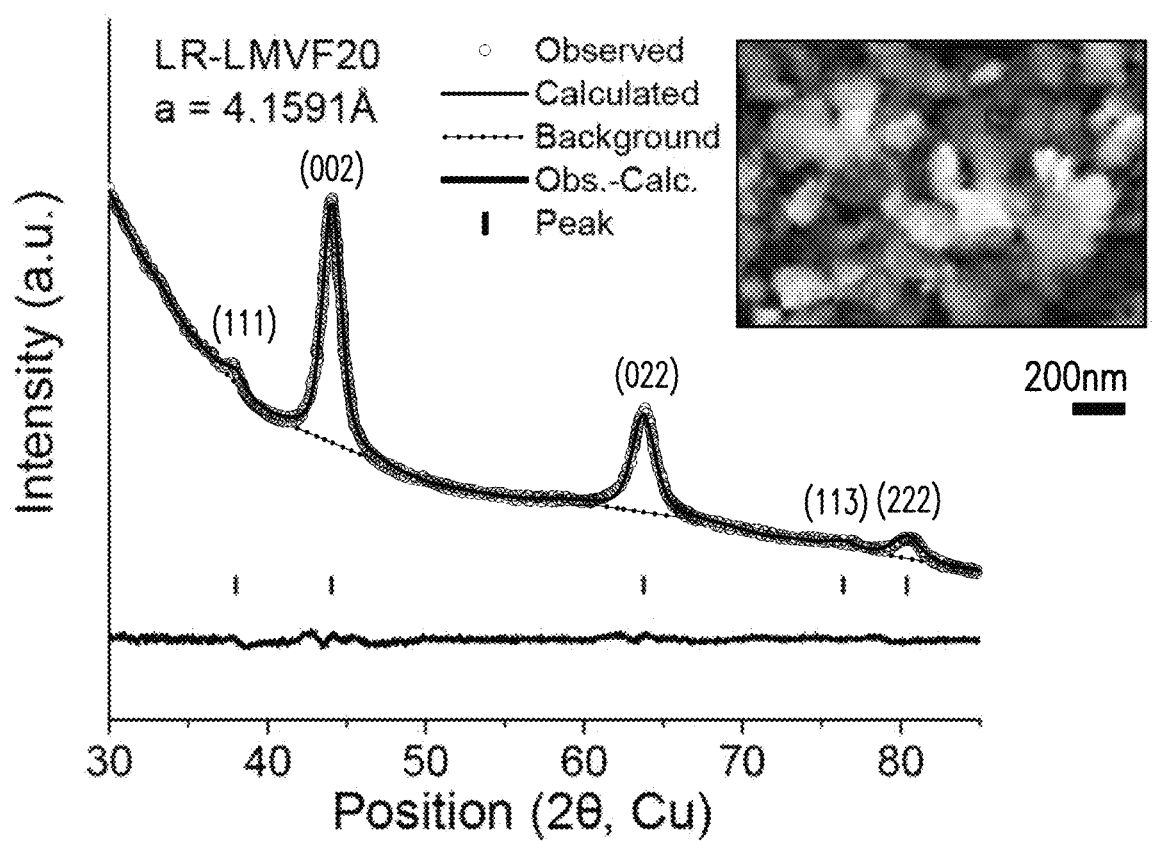

Using a subset of these compositions, it was demonstrated experimentally that these compounds indeed yield high performing Li-ion cathodes. The phase-pure disordered rocksalt structure of LR-LMVO and LR-LMVF20 is clear from the X-ray diffraction pattern shown in FIG. 11A and FIG. 11B respectively. That is, FIGS. 11A and 11B show X-ray diffraction patterns and scanning electron microscopy images of the as-synthesized (a) LR-LMVO and (b) LR-LMVF20 materials, respectively, revealing that the products are phase pure disordered rocksalts.

Figure 12A:
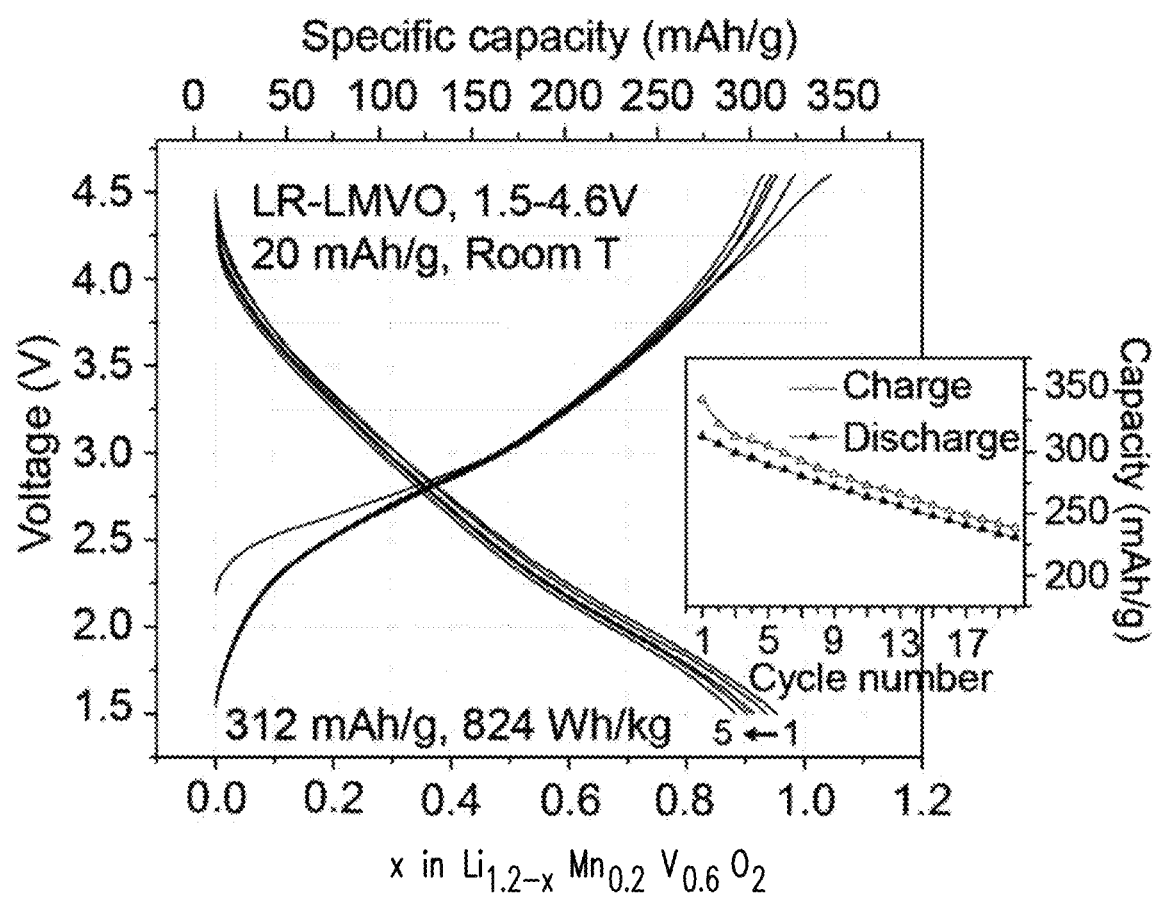
FIGS. 12A and 12B show galvanostatic charge/discharge voltage profiles of (a) LR-LMVO and (b) LR-LMVF20, respectively, taken for the first five cycles in a 1.5V to 4.6V voltage window. The inset shows the fade in charge and discharge capacity over the first 20 cycles.
Figure 12B:
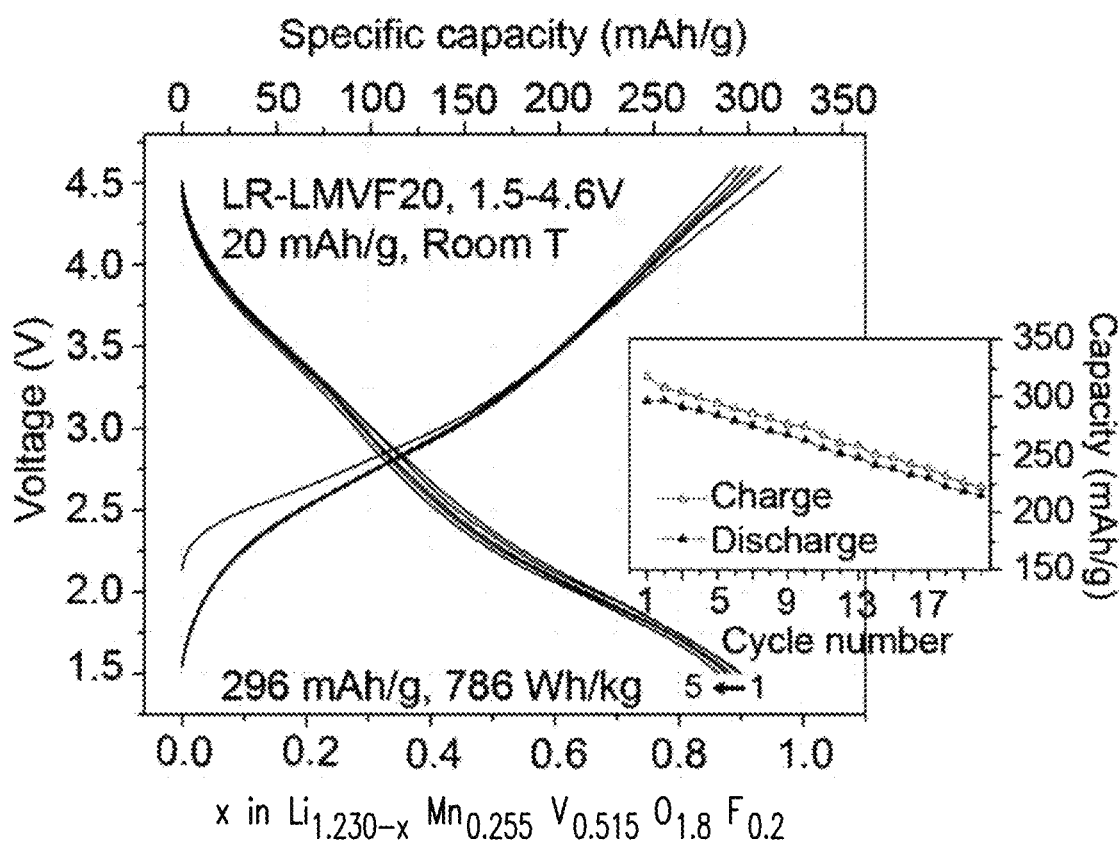

The electrochemical performance of these cathodes is shown in FIG. 12A and FIG. 12B respectively. That is, FIGS. 12A and 12B show galvanostatic charge/discharge voltage profiles of (a) LR-LMVO and (b) LR-LMVF20, respectively, taken for the first five cycles in a 1.5V to 4.6V voltage window. The inset shows the fade in charge and discharge capacity over the first 20 cycles.

As seen, at a 4.6V cutoff voltage, LR-LMVO achieves a first charge discharge capacity up to 312 mAh/g (824 Wh/kg) and LR-LMVF20 achieves a first-charge discharge capacity of 296 mAh/g (786 Wh/kg). Importantly, the energy density achieved at the 4.6 cutoff voltage is highly reversible, as evidenced by repeated cycling curves shown in the insets in FIG. 12A and FIG. 12B, demonstrating a very slow fade in charge and discharge capacity over the first 20 cycles. The reversibility of this material favorably contrasts with other reported Li-excess cathodes[1], which routinely lose much of their capacity after the first few cycles due to oxygen loss, or are reversible only at low voltage[2]. In the compositions reported here, the high transition metal content, whose capacity is balanced to match the accessible Li content, eliminates the need for O capacity on charge/discharge, promoting reversible electrochemical performance.

[1] See J. Lee, D.-H. Seo, M. Balasubramanian, N Twu, X. Li, G. Ceder, Energy Environ. Sci. 8, 3255 (2014); N. Yabuuchi et al. Proc. Natl Acad. Sci. 112, 7650-7655 (2015); N. Yabuuchi, et al. Nat. Commun. 7, 13814 (2016); Armstrong, A. R. et al. J. Am. Chem. Soc. 128, 8694-8698 (2006); Hong, J. et al. Chem. Mater. 24, 2692-2697 (2012); and Hy, S., et al. J. Am. Chem. Soc. 136, 999-1007 (2014).

[2] See Hoshino, Satoshi, et al. ACS Energy Letters 2, 733-738 (2017).

While previous patents and patent applications[3] exist in the space of oxyfluoride Li-battery cathodes, these patents do not cover the space of disordered rocksalts with a mixture of divalent transition metal ($Mn^{2+}$, $Fe^{2+}$, $Co^{2+}$, $Ni^{2+}$) with V or Mo as is the case here. The present invention specifically focuses on combining the electrochemical activity of these divalent metals with limited activity from V or Mo and optionally using F substitution to achieve additional degree of freedom in Li composition, as well as balancing accessible Li capacity with that of the redox-active transition metals in the material. Thus, the present invention provides for the ability to design compositions that are directed at providing optimal electrochemical performance.

[3] See R. Chen, S. Ren, S. Indris, M. Fichtner, H. Hahn, EP2921455 A1, Patent application (2015 Sep. 24); and S. Kang, K. Amine, UC 2004/0091779 A1, Patent application (2003)

An immediate application example of the present invention aspects is for high energy density Li-ion cathode battery cathode materials, where the cathode energy density is a key limiting factor to overall cell performance. In particular, embodiments under aspects of the present invention are well suited for use in long-life secondary Li-ion cells where the reversibility of the present invention compounds represent a desirable feature for achieving consistent performance over charge/discharge cycles.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Furthermore, when numerical ranges of varying scope are set forth herein, it is contemplated that any combination of these values inclusive of the recited values may be used. Indeed, all ranges disclosed herein are inclusive and combinable. For example, all ranges are inclusive of the endpoints and all intermediate values of the ranges.

The invention described and claimed herein is not to be limited in scope by the specific embodiments herein disclosed, since these embodiments are intended as illustrations of several aspects of the invention. The several aspects of the invention include all available, non-contradicting subcombinations of the claims presented below. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A lithium metal oxyfluoride having a general formula: $Li_xM'_aM''_bO_{2-y}F_y$, said lithium metal oxyfluoride having a cation-disordered rocksalt structure of one of (a) or (b), wherein
   (a) $1.09 \leq x \leq 1.35$, $0.1 \leq a \leq 0.7$, $0.1 \leq b \leq 0.7$, and $0 < y \leq 0.7$; M' is a low-valent transition metal and M" is a high-valent transition metal; and
   (b) $1.1 \leq x \leq 1.33$, $0.1 \leq a \leq 0.41$, $0.39 \leq b \leq 0.67$, and $0 < y \leq 0.3$; M' is Mn; and M" is V or Mo.

2. The lithium metal oxyfluoride of claim 1, wherein the rocksalt structure is (a) and M' is selected from the group consisting of $Mn^{2+}$, $Fe^{2+}$, $Co^{2+}$, $Ni^{2+}$, and combinations thereof.

3. The lithium metal oxyfluoride of claim 2, wherein M' is $Mn^{2+}$.

4. The lithium metal oxyfluoride of claim 1, wherein the rocksalt structure is (a) and M" is selected from the group consisting of $V^{3+}$, $V^{4+}$, $Mo^{4+}$, $Mo^{5+}$, and combinations thereof.

5. The lithium metal oxyfluoride of claim 4, wherein M" is $V^{4+}$ or $Mo^{5+}$.

6. The lithium metal oxyfluoride of claim 4 having a formula: $Li_xM'_aV_bO_{2-y}F_y$, wherein $1.09 \leq x \leq 1.35$, $0.1 \leq a \leq 0.7$, $0.1 \leq b \leq 0.7$, and $0 < y \leq 0.7$.

7. The lithium metal oxyfluoride of claim 1, wherein the rocksalt structure is (a) and $1.1 \leq x \leq 1.2$, $0.25 \leq a \leq 0.4$, $0.4 \leq b \leq 0.6$, and $0 < y \leq 0.3$.

8. The lithium metal oxyfluoride of claim 1, having a cation-disordered rocksalt structure characterized by a crystallographic space group Fm-3m.

9. The lithium metal oxyfluoride of claim 1, having a discharge capacity of about 250 mAh/g to about 400 mAh/g.

10. The lithium metal oxyfluoride of claim 1, having an energy density of about 700 Wh/kg to about 900 Wh/kg.

11. A positive electrode material, comprising:
    a lithium metal oxyfluoride of claim 1.

12. A lithium-ion battery, comprising:
    a negative electrode material;
    an electrolyte; and
    the positive electrode material of claim 11.

13. A portable electronic device, an automobile, or an energy storage system, comprising:
    the lithium-ion battery of claim 12.

14. A lithium metal oxyfluoride having a general formula: $Li_xM'_aM''_bO_{2-y}F_y$, said lithium metal oxyfluoride having a cation-disordered rocksalt structure, wherein $1.1 \leq x \leq 1.33$, $0.1 \leq a \leq 0.41$, $0.39 \leq b \leq 0.67$, and $0 < y \leq 0.3$; M' is Mn; and M" is V or Mo.

15. The lithium metal oxyfluoride of claim 14 is $Li_{1.23}Mn_{0.255}V_{0.515}O_{1.8}F_{0.2}$ (LR-LMVF20).

16. The lithium metal oxyfluoride of claim 14, wherein M' is $Mn^{2+}$.

17. The lithium metal oxyfluoride of claim 14, wherein M" is selected from the group consisting of $V^{3+}$, $V^{4+}$, $Mo^{4+}$, $Mo^{5+}$.

18. The lithium metal oxyfluoride of claim 17, wherein M" is $V^{4+}$ or $Mo^{5+}$.

19. The lithium metal oxyfluoride of claim 14, wherein M" is V.

20. The lithium metal oxyfluoride of claim 14, wherein $1.1 \leq x \leq 1.2$, $0.25 \leq a \leq 0.4$, $0.4 \leq b \leq 0.6$, and $0 < y \leq 0.3$.

21. The lithium metal oxyfluoride of claim 14, having a cation-disordered rocksalt structure characterized by a crystallographic space group Fm-3m.

22. The lithium metal oxyfluoride of claim 14, having a discharge capacity of about 250 mAh/g to about 400 mAh/g.

23. The lithium metal oxyfluoride of claim 14, having an energy density of about 700 Wh/kg to about 900 Wh/kg.

24. A positive electrode material, comprising:
a lithium metal oxyfluoride of claim 14.

25. A lithium-ion battery, comprising:
a negative electrode material;
an electrolyte; and
the positive electrode material of claim 24.

26. A portable electronic device, an automobile, or an energy storage system, comprising:
the lithium-ion battery of claim 25.

* * * * *